(12) United States Patent
Tamura et al.

(10) Patent No.: US 9,936,125 B2
(45) Date of Patent: Apr. 3, 2018

(54) IMAGE PICKUP APPARATUS INCLUDING MIRROR UNIT AND METHOD OF CONTROLLING THE SAME

(71) Applicant: CANON KABUSHIKI KAISHA, Tokyo (JP)

(72) Inventors: Koji Tamura, Kawasaki (JP); Jun Kamiya, Kawasaki (JP); Shogo Iwasaki, Kawasaki (JP); Haruhisa Ueda, Tokyo (JP); Kazuaki Yamana, Kawasaki (JP); Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/398,189

(22) Filed: Jan. 4, 2017

(65) Prior Publication Data

US 2017/0195546 A1 Jul. 6, 2017

(30) Foreign Application Priority Data

Jan. 6, 2016 (JP) .................................. 2016-001096
Jan. 6, 2016 (JP) .................................. 2016-001097
(Continued)

(51) Int. Cl.
*H04N 5/232* (2006.01)
*G03B 19/12* (2006.01)
(Continued)

(52) U.S. Cl.
CPC ..... *H04N 5/23212* (2013.01); *G02B 26/0816* (2013.01); *G03B 19/12* (2013.01);
(Continued)

(58) Field of Classification Search
CPC ............. H04N 5/23212; H04N 5/2254; H04N 5/2256; H04N 5/23293; G02B 19/12; G02B 26/0816
See application file for complete search history.

(56) References Cited

U.S. PATENT DOCUMENTS

2009/0148147 A1* 6/2009 Fujii .................. H04N 5/23212
396/128
2009/0245779 A1* 10/2009 Negita .................. G03B 19/12
396/358
(Continued)

FOREIGN PATENT DOCUMENTS

JP 09-274249 A 10/1997
JP 2001-083402 A 3/2001
JP 2007-322895 A 12/2007

*Primary Examiner* — Nhan T Tran
(74) *Attorney, Agent, or Firm* — Cowan, Liebowitz & Latman, P.C.

(57) ABSTRACT

An image pickup apparatus enabling release time lag reduction. A first holder holds a first mirror and is movable between a first position in an optical path and a second position retracted from the optical path. A second holder holding a second mirror in a state rotatably attached to the first holder is movable between a third position in the optical path and a fourth position retracted from the optical path. An MPU causes an mirror drive unit to rotate the second holder in the third position toward the first holder in the first position, after termination of focus detection when the first and second holder are in the first and third positions, respectively, and before image pickup is instructed, to thereby move the second holder to a fifth position closer to the first holder than the third position is.

10 Claims, 22 Drawing Sheets

(30) Foreign Application Priority Data

Jan. 6, 2016 (JP) .................................. 2016-001098
Jan. 6, 2016 (JP) .................................. 2016-001099
Feb. 8, 2016 (JP) .................................. 2016-021839

(51) Int. Cl.
*H04N 5/225* (2006.01)
*G02B 26/08* (2006.01)

(52) U.S. Cl.
CPC ......... *H04N 5/2254* (2013.01); *H04N 5/2256* (2013.01); *H04N 5/23293* (2013.01)

(56) References Cited

U.S. PATENT DOCUMENTS

| | | | | |
|---|---|---|---|---|
| 2013/0209084 A1* | 8/2013 | Yamana | .................. | G03B 19/12 |
| | | | | 396/358 |
| 2014/0368941 A1* | 12/2014 | Sato | .................... | G02B 7/1821 |
| | | | | 359/877 |
| 2015/0010297 A1* | 1/2015 | Sanada | .................. | G03B 19/12 |
| | | | | 396/358 |
| 2016/0018668 A1* | 1/2016 | Yamana | ............... | H04N 5/2254 |
| | | | | 348/208.11 |
| 2016/0054542 A1* | 2/2016 | Yamana | .................. | G03B 19/12 |
| | | | | 359/874 |

* cited by examiner

FIG. 6A  EVALUATION PHOTOMETRY RANGE
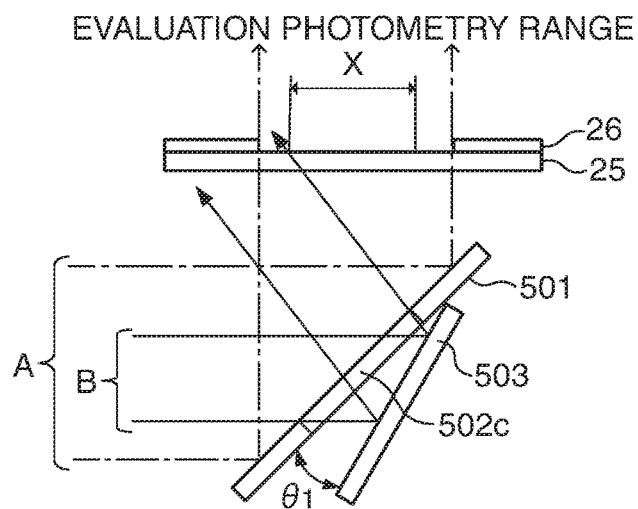
FIG. 6B  PARTIAL PHOTOMETRY RANGE
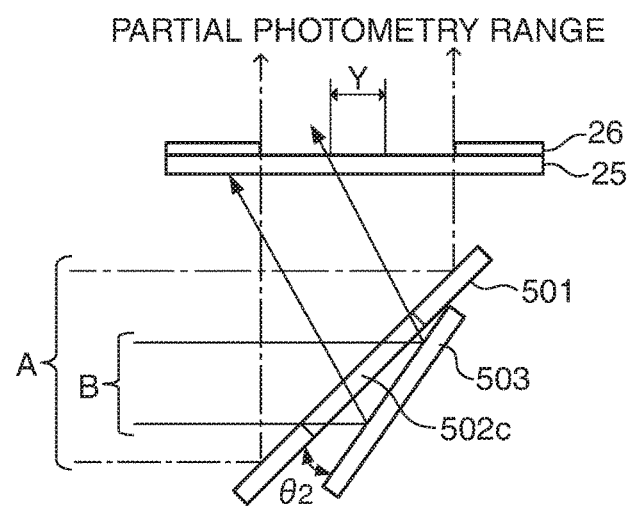
FIG. 6C  SPOT PHOTOMETRY RANGE
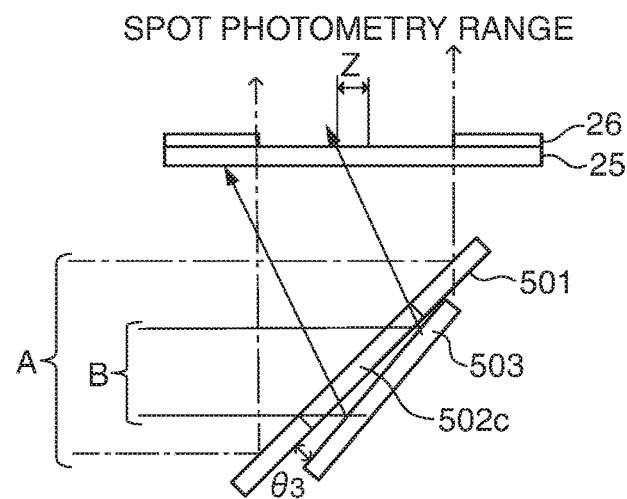

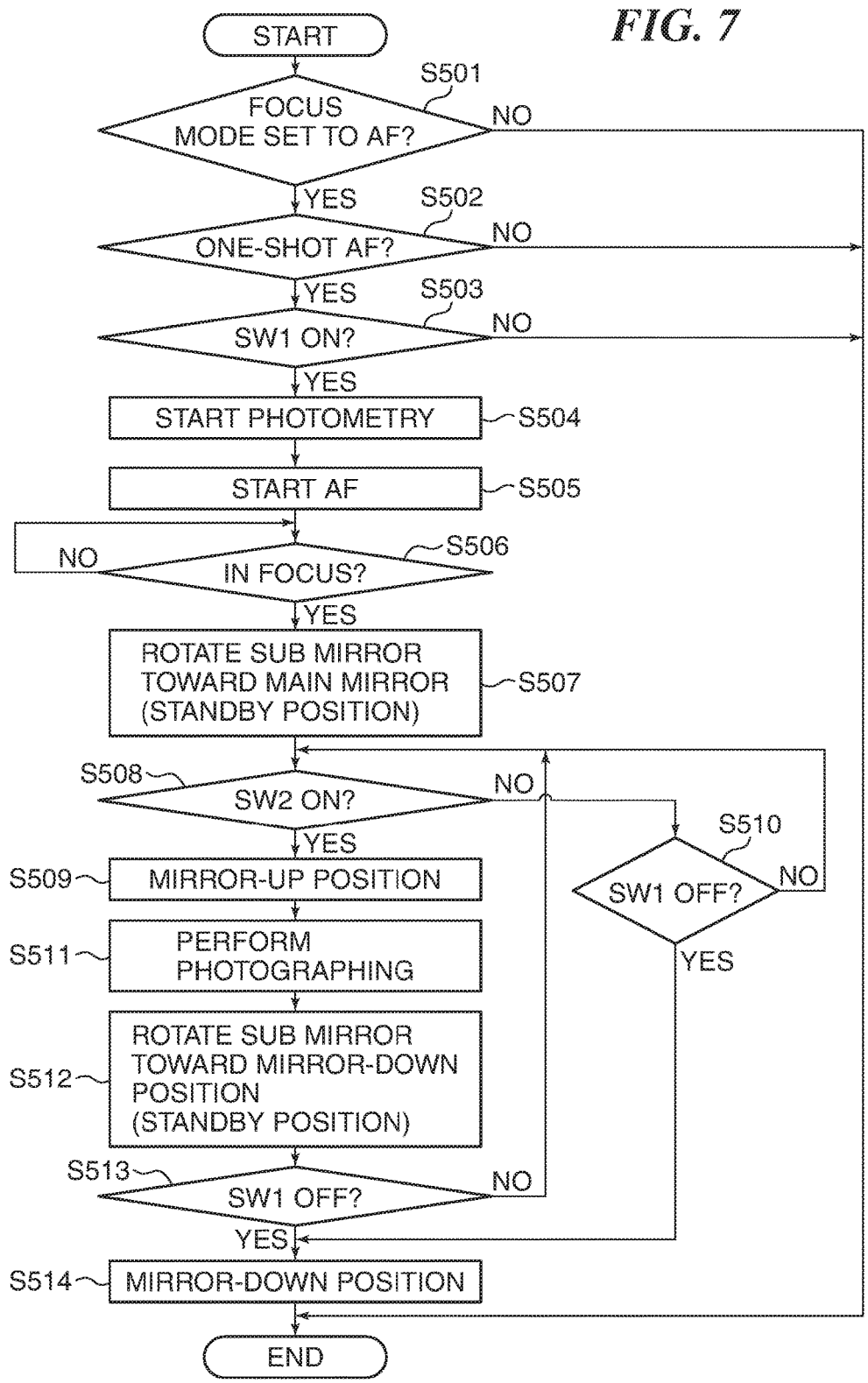

IMAGE PICKUP APPARATUS INCLUDING MIRROR UNIT AND METHOD OF CONTROLLING THE SAME

BACKGROUND OF THE INVENTION

Field of the Invention

The present invention relates to an image pickup apparatus, such as a single-lens reflex camera, and more particularly to a technique for controlling the operation and driving of a quick return mirror, such as correction control of an output value from a photometric unit in driving the quick return mirror, and a technique for controlling the operation of the quick return mirror in strobe photographing.

Description of the Related Art

An image pickup apparatus, such as a single-lens reflex camera, is provided with a quick return mirror mechanism including a main mirror holder for holding a main mirror formed by a half mirror, and a sub mirror holder that holds a sub mirror and is rotatably supported with respect to the main mirror holder. The quick return mirror mechanism enters a photographing optical path (mirror down) to guide an object light flux having passed through a photographing optical system to a viewfinder optical system during viewfinder observation, and retracts from the photographing optical path (mirror up) to guide an object light flux to an image pickup device during photographing. Further, during viewfinder observation, the quick return mirror mechanism reflects an object light flux having passed through the main mirror by the sub mirror to guide the reflected object light flux to a focus detection unit (Japanese Patent Laid-Open Publication No. H09-274249).

For an image pickup apparatus of this type, there has been conventionally proposed a technique that changes an exit angle of light guided to a focus detection optical system to thereby make it possible to perform focus detection in a desired wide range in a vertical direction and a horizontal direction within a photographing range (Japanese Patent Laid-Open Publication No. 2001-83402).

The object light flux guided to the viewfinder optical system is divided into two light fluxes by a pentaprism, one of which is guided to an eyepiece lens, and the other of which is guided to a photometry sensor for photometry measurement. When the mirror unit is in the mirror-up position, an object light flux having passed through the photographing optical system is guided to an imaging surface of the image pickup device, and is photoelectrically converted.

Further, for strobe photographing, there has been proposed a technique in which preliminary light emission is performed when the main mirror is in a predetermined position, and a light emission amount for final light emission is determined based on a result of photometry by the photometry sensor during the preliminary light emission, so as to perform the final light emission for photographing (Japanese Patent Laid-Open Publication No. 2007-322895).

However, the mechanism disclosed in Japanese Patent Laid-Open Publication No. H09-274249 has the configuration in which the sub mirror holder is pulled up by the main mirror holder in the mirror-up operation, and hence the inertia force of the sub mirror holder acts when the main mirror holder performs the mirror-up operation. For this reason, there is a limit to the speed of the mirror-up operation, and the limit prevents reduction of the release time lag.

On the other hand, the technique disclosed in Japanese Patent Laid-Open Publication No. 2001-83402 has a problem that when a sufficient amount of light is to be guided to the focus detection optical system, the amount of light guided to the viewfinder optical system is reduced, which brings about a problem of a dark finder image. Further, in a case where part of a light flux guided to the viewfinder optical system is used for photometry by the photometry sensor, the accuracy of photometry is lowered particularly under a low luminance environment.

Further, the main mirror of the mirror unit is generally formed by a half mirror because it is necessary to guide a light flux to the focus detection unit. For this reason, the light amount of the light flux reflected to the viewfinder optical system is reduced by an amount of the light flux which reaches the main mirror and passes therethrough to the sub mirror side when the mirror unit is in the mirror-down position, whereby the amount of light guided to the photometry sensor is also reduced. Therefore, in the technique disclosed in Japanese Patent Laid-Open Publication No. 2007-322895, to obtain an accurate amount of final strobe light emission for a photographic scene which is dark with a large camera-to-object distance, or the like, it is necessary to increase the light amount of preliminary strobe light emission, which increases power consumption.

SUMMARY OF THE INVENTION

The present invention provides an image pickup apparatus that makes it possible to educe the release time lag by controlling the operation of a second mirror holder in a mirror-up operation.

The present invention further provides an image pickup apparatus that makes it possible to reduce the release time lag without affecting a photometric value by controlling the operation of the second mirror holder in the mirror-up operation.

The present invention further provides an image pickup apparatus that makes it possible to reduce the release time lag without affecting a photometric value, by rotating the second mirror holder to a position of a first mirror holder and holding the same there in advance, and correcting an output value from a photometric unit.

The present invention further provides an image pickup apparatus that achieves improvement of object visibility and improvement of the accuracy of photometry under a low luminance environment, by increasing the amount of light guided to the viewfinder optical system to thereby make a finder image brighter.

The present invention further provides a technique that enables an image pickup apparatus equipped with a mirror unit to obtain an accurate amount of final strobe light emission without increasing the amount of electric power necessary for preliminary strobe light emission.

In a first aspect of the invention, there is provided an image pickup apparatus comprising an image pickup device, a first mirror holder that holds a first mirror and is configured to be movable between a first position in a photographing optical path and a second position retracted from the photographing optical path, a second mirror holder that holds a second mirror in a state rotatably attached to the first mirror holder and is configured to be movable between a third position in the photographing optical path and a fourth position retracted from the photographing optical path, a drive unit configured to move the second mirror holder between the third position and the fourth position, a focus detection sensor configured to receive an object light flux that has passed through the first mirror and has been reflected from the second mirror, when the first mirror holder is in the first position and the second mirror holder is in the third position, an instruction unit configured to instruct focus detection using the focus detection sensor in response to a first operation performed on an operation section and instruct image pickup using the image pickup device in response to a second operation performed on the operation section, and a control unit configured to cause the drive unit to rotate the second mirror holder in the third position toward the first mirror holder in the first position, after termination of the focus detection instructed in response to the first operation when the first mirror holder is in the first position and the second mirror holder is in the third position, and before the image pickup using the image pickup device is instructed in response to the second operation, to thereby cause the second mirror holder to move to a fifth position closer to the first mirror holder than the third position is.

In a second aspect of the invention, there is provided an image pickup apparatus comprising an image pickup device, a first mirror holder that holds a first mirror, a second mirror holder that holds a second mirror and is configured to be capable of changing a relative position with respect to the first mirror holder, a focus detection sensor configured to receive an object light flux that has passed through the first mirror and has been reflected from the second mirror, when a position of the first mirror holder and a position of the second mirror holder are in a first state, and a drive unit configured to make the position of the second mirror holder closer to the first mirror holder than in the first state, after performing the focus detection using the focus detection sensor when the position of the first mirror holder and the position of the second mirror holder are in the first state, and before image pickup using the image pickup device is instructed.

According to the present invention, it is possible to provide the image pickup apparatus that makes it possible to reduce the release time lag by controlling the operation of the second mirror holder in the mirror-up operation.

Further features of the present invention will become apparent from the following description of exemplary embodiments (with reference to the attached drawings).

BRIEF DESCRIPTION OF THE DRAWINGS

FIGS. 6A to 6C are views useful in explaining the standby position of the sub mirror holder associated with each of photometry modes when the mirror unit is in an intermediate position.

FIG. 7 is a flowchart of a control process for controlling the operation of the camera when a shutter time lag reduction mode is selected.

DESCRIPTION OF THE EMBODIMENTS

The present invention will now be described in detail below with reference to the accompanying drawings showing embodiments thereof.

Figure 1:
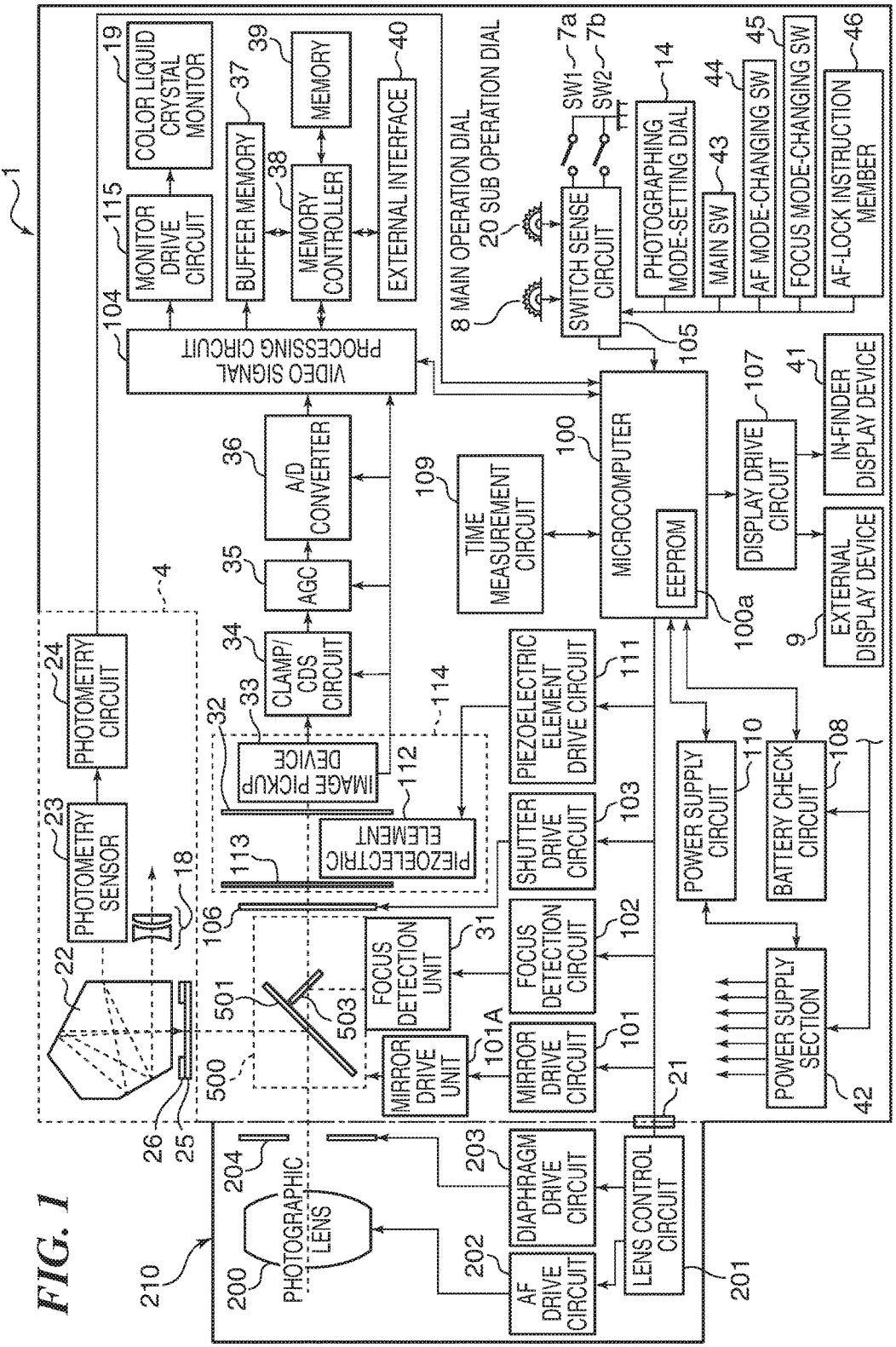
FIG. 1 is a system block diagram of a digital single-lens reflex camera as an image pickup apparatus according to a first embodiment of the present invention.
Figure 2A:
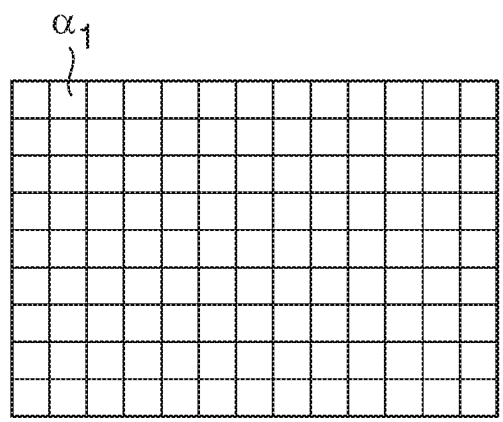
FIGS. 2A and 2B are output correction charts used when correcting an output value from a photometry sensor.
Figure 2B:
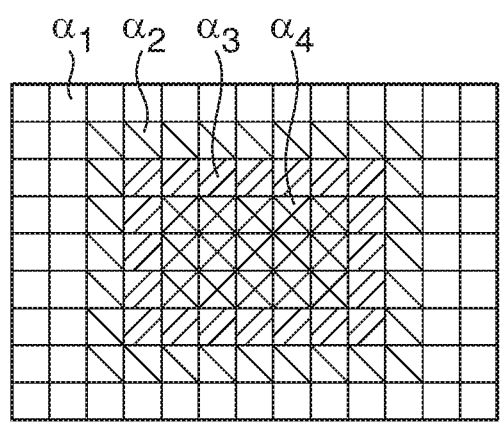

FIG. 1 is a system block diagram of a digital single-lens reflex camera as an image pickup apparatus according to a first embodiment of the present invention. FIGS. 2A and 2B are output correction charts used when correcting an output value from a photometry sensor.

As shown in FIG. 1, in the digital single-lens reflex camera (hereinafter referred to as the camera) as an image pickup apparatus according to the present embodiment, an interchangeable lens unit 210 is mounted on a camera body 1 via a mount contact portion 21 in a removable manner.

First, a description will be given of the camera body 1. In FIG. 1, a microcomputer 100 (hereinafter referred to as the MPU 100) controls the overall operation of the camera. An EEPROM 100a incorporated in the MPU 100 stores time information of a time measurement circuit 109, programs, and other information items. To the MPU 100, there are connected a mirror drive circuit 101, a focus detection circuit 102, a shutter drive circuit 103, a video signal processing circuit 104, a switch sensing circuit 105, and a photometric circuit 24 of a viewfinder optical system 4. Further, to the MPU 100, there are connected a display drive circuit 107, a battery check circuit 108, the time measurement circuit 109, a power supply circuit 110, and a piezoelectric element drive circuit 111, and these circuits are driven by the control of the MPU 100.

A mirror unit 500 includes a main mirror 501 formed by a half mirror, and a sub mirror 503, which are moved to a position where they retract from a photographing optical path (mirror-up position) during photographing, and are moved to a position where they enter the photographing optical path (mirror-down position) during finder observation.

When the mirror unit 500 is in the mirror-down position, the main mirror 501 reflects an object light flux having passed through a photographic lens 200 as a component of a photographic optical system of the lens unit 210, thereby guiding the same to the viewfinder optical system 4, and also causes part of the object light flux to transmit therethrough, thereby guiding the same to the sub mirror 503. The sub mirror 503 reflects the object light flux transmitted through the main mirror 501, thereby guiding the same to a focus detection unit 31. Further, when the mirror unit 500 is in the mirror-up position, the object light flux having passed through the photographic lens 200 is guided to an image pickup device 33.

The object light flux guided to the viewfinder optical system 4 forms an image on a focusing plate 25, and is guided to a pentaprism 22 after an unnecessary light flux is cut by a field mask 26. The pentaprism 22 is an optical member that converts a photographing light flux reflected by the main mirror 501 to an erect normal image, to reflect the converted image, whereby a user can view the object image from a viewfinder eyepiece lens 18 via the pentaprism 22. Further, the pentaprism 22 also guides part of the object light flux to the photometry sensor, denoted by reference numeral 23.

The photometry sensor 23 detects part of the photographing light flux by light receiving elements which are divided in association with areas on an observation surface. The photometric circuit 24 converts output values from the photometry sensor 23 to luminance signals of the respective areas on the observation surface, and outputs the luminance signals to the MPU 100 after correcting the same using correction values of the output correction chart, which are associated with the areas, respectively, as shown in FIGS. 2A and 2B. In the output correction chart, the correction values for correcting variation in luminance in each area and an insufficient amount of light at the time of low luminance are set as a map. The MPU 100 calculates an exposure value based on the luminance signals output from the photometric circuit 24. Note that correction of the output values from the photometry sensor 23 will be described in detail hereinafter. Although details will be described hereinafter, in photometry, photometry modes suitable for various photographing conditions can be selected.

Figure 3A:
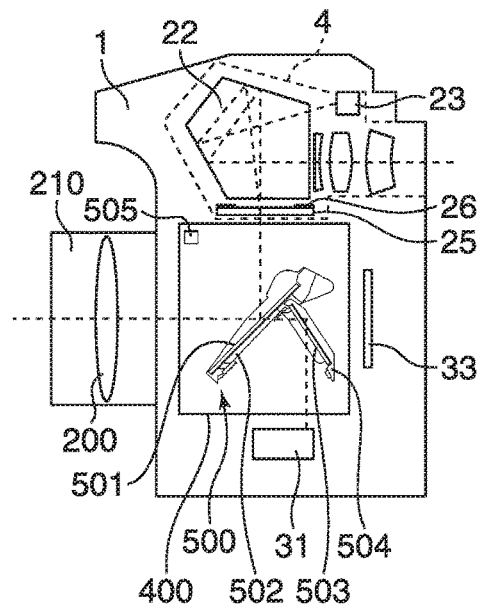
FIGS. 3A to 3C are schematic side cross-sectional views of the digital single-lens reflex camera.

The mirror drive circuit 101 is connected to a mirror drive unit 101A comprised of a motor, a gear train, etc., none of which are specifically shown, for rotating the mirror unit 500 between the mirror-up position (see FIG. 3C) and the mirror-down position (see FIG. 3A).

The focus detection unit 31 is formed by a field lens disposed in the vicinity of an imaging surface, not shown, a reflection mirror, a secondary imaging lens, a diaphragm, a line sensor formed by a plurality of CCD sensors, and so forth. A signal output from the focus detection unit 31 is supplied to the focus detection circuit 102, and is sent to the MPU 100 after being converted to an object image signal. The MPU 100 performs focus detection calculation by a phase difference detection method based on the supplied object image signal.

Then, the MPU 100 calculates a defocus amount and a defocus direction, and causes a lens control circuit 201 and an AF drive circuit 202 of the lens unit 210 to drive a focus lens of the photographic lens 200 to an in-focus position based on a result of the calculation.

A mechanical focal plane shutter 106 blocks an object light flux guided to the image pickup device 33 during finder observation, and during photographing, operates to obtain a desired exposure time based on a time difference between traveling of a front curtain, not shown, and traveling of a rear curtain, not shown, in response to a release signal input by the user. The focal plane shutter 106 is controlled by the shutter drive circuit 103 in response to a command from the MPU 100.

An image pickup device unit 114 is comprised of the image pickup device 33, a laminate-type piezoelectric element 112, and an optical low-pass filter 113. The image pickup device 33 is implemented e.g. by a CCD sensor, a CMOS sensor, or a CID sensor. A clamp/CDS (correlated double sampling) circuit 34 performs basic analog processing before A/D conversion, and is also capable of changing a clamp level. An AGC (automatic gain controller) 35 performs basic analog processing before A/D conversion, and is also capable of changing an AGC basic level. An analog-to-digital converter 36 converts an analog signal output from the image pickup device 33 to a digital signal.

An infrared ray cut filter 32 is formed into a substantially rectangular shape, and cuts unnecessary infrared light of an object light flux to be guided to the image pickup device 33. The infrared ray cut filter 32 has a surface covered by a conductive material in order to prevent foreign matter from sticking thereto. The optical low-pass filter 113 is formed by laminating and affixing a plurality of birefringent plates and phase plates, which are made of quartz, to each other, and further affixing an infrared ray cut filter to the resulting laminate. The laminate-type piezoelectric element 112 is excited by the piezoelectric element drive circuit 111 having received a command from the MPU 100, and vibration thereof is transmitted to the optical low-pass filter 113.

The video signal processing circuit 104 performs general image processing by hardware, such as gamma/knee processing, filtering processing, and information synthesis processing for monitor display, on digital image data. Color image data for monitor display, output from the video signal processing circuit 104, is displayed on a color liquid crystal monitor 19 via a monitor drive circuit 115.

Further, the video signal processing circuit 104 is also capable of storing image data in a buffer memory 37 via a memory controller 38 according to an instruction from the MPU 100. Further, the video signal processing circuit 104 has a function of performing image data compression processing, such as JPEG compression. Further, in a case where images are continuously photographed e.g. by continuous photographing, the video signal processing circuit 104 is also capable of temporarily storing image data in the buffer memory 37, and sequentially reading out unprocessed image data via the memory controller 38. This enables the video signal processing circuit 104 to sequentially perform image processing and compression processing on the unprocessed image data regardless of a rate at which image data is output from the A/D converter 36.

The memory controller 38 has a function of storing image data output from an external interface 40, such as a USB output connector, in a memory 39, and a function of outputting image data stored in the memory 39 to the external interface 40. Note that as the memory 39, for example, a flash memory is used which can be mounted and removed to and from the camera body 1.

A release switch (SW1) 7a is turned on by performing a first operation (such as a half-pressing operation) of a release button, not shown, and sends a photographing preparation start instruction signal to the MPU 100 via the switch sense circuit 105. Upon receipt of the photographing preparation start instruction signal, focus detection by the focus detection unit 31 is started, and a focusing operation is performed. A release switch (SW2) 7b is turned on by performing a second operation (such as a fully-pressing operation) of the release button, and sends a photographing start instruction signal to the MPU 100 via the switch sense circuit 105. The release button corresponds to an example of an operation member.

Further, a main operation dial 8, a sub operation dial 20, a photographing mode-setting dial 14, a focus mode-changing switch 45, a main switch 43, and an AF mode-changing switch 44 are connected to the switch sense circuit 105. The focus mode-changing switch 45 is a switch for selecting a focus mode, and a user can select one of an AF (auto focus) mode and an MF (manual focus) mode. The AF mode-changing switch 44 is a switch for selecting an AF mode, and the user can select one of a one-shot AF mode, an AI servo AF mode, and an AI focus AF mode.

Further, an AF-lock instruction member 46 is connected to the switch sense circuit 105. The AF-lock instruction member 46 is a member for instructing an AF-lock operation in which a photographer decides and fixes an in-focus position.

The display drive circuit 107 drives an external display device 9 and an in-finder display device 41 according to instructions from the MPU 100. The battery check circuit 108 performs battery check for a predetermined time period according to an instruction from the MPU 100, and sends a result of the check to the MPU 100. A power supply section 42 supplies necessary power to the components of the camera according to an instruction provided from the MPU 100 via the power supply circuit 110. The time measurement circuit 109 measures a time period elapsed after the main switch 43 is turned off until the main switch 43 is turned on next, and sends a result of the measurement to the MPU 100 in response to a command from the MPU 100.

Next, a description will be given of the lens unit 210. The lens unit 210 includes the lens control circuit 201, and the lens control circuit 201 performs communication with the MPU 100 of the camera body 1 via the mount contact portion 21. The mount contact portion 21 also has a function of sending a signal to the MPU 100 when the lens unit 210 is connected to the camera body 1.

The lens control circuit 201 performs communication with the MPU 100 by using this function, and drives the photographic lens 200 and the diaphragm, denoted by reference numeral 204, via the AF drive circuit 202 and a diaphragm drive circuit 203. Although FIG. 1 shows one photographic lens 200 for convenience of explanation, the photographic lens 200 is actually formed by a lens group including a plurality of lenses.

The AF drive circuit 202 is comprised of e.g. a stepping motor, and changes the position of the focus lens of the photographic lens 200 in a direction of an optical axis under the control of the lens control circuit 201 to thereby perform the focusing operation. The diaphragm drive circuit 203 is comprised of e.g. an automatic iris, and changes the opening diameter of the diaphragm 204 under the control of the lens control circuit 201 to thereby obtain an optical aperture value.

Figure 3B:
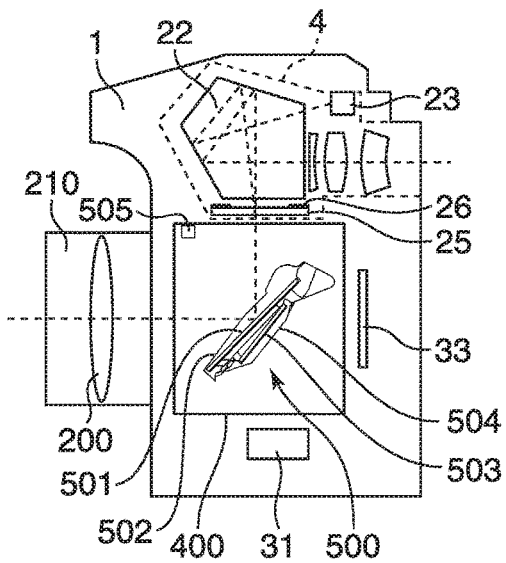
Figure 3C:
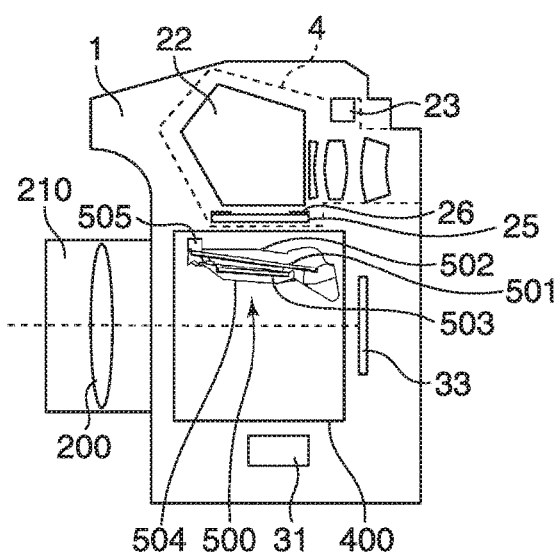

FIG. 3A is a schematic side cross-sectional view of the camera when the mirror unit 500 is in the mirror-down position, and FIG. 3B is a schematic side cross-sectional view of the camera when the sub mirror 503 is in a position (standby position) in which the sub mirror 503 is closed to the main mirror 501 in the mirror-down position and is overlaid thereon. FIG. 3C is a schematic side cross-sectional view of the camera when the mirror unit 500 is in the mirror-up position.

As shown in FIGS. 3A to 3C, the main mirror 501 of the mirror unit 500 is held by a main mirror holder 502, and the sub mirror 503 is held by a sub mirror holder 504. Further, the main mirror holder 502 is rotatably supported with respect to a mirror box 400, and the sub mirror holder 504 is rotatably supported with respect to the main mirror holder 502. The mirror unit 500 is driven by a mirror drive unit 101A, and is turned between the mirror-down position shown in FIG. 3A and the mirror-up position shown in FIG. 3C in which the mirror unit is in contact with a stopper 505 provided in the mirror box 400.

In the mirror-down position shown in FIG. 3A, the mirror unit 500 enters the photographing optical path, an object light flux having passed through the photographic lens 200 is reflected by the main mirror 501, and part of the object light flux is transmitted through the main mirror 501 and is reflected by the sub mirror 503. The object light flux reflected by the main mirror 501 is guided to the pentaprism 22 through the focusing plate 25 and the field mask 26 of the viewfinder optical system 4, and is divided into two light fluxes by the pentaprism 22, one of which is guided to the viewfinder eyepiece lens 18, and the other of which is guided to the photometry sensor 23 for photometry. Further, the object light flux reflected by the sub mirror 503 is guided to the focus detection unit 31.

Therefore, in the state shown in FIG. 3A, the object light flux transmitted through the photographic lens 200 is not guided to the image pickup device 33. At this time, the light amount of an object image which can be checked by a photographer via the viewfinder eyepiece lens 18 of the viewfinder optical system 4, and the light amount of the light flux measured by the photometry sensor 23 are each reduced by the amount of light guided to the focus detection unit 31.

The object light flux guided to the photometry sensor 23 when the mirror unit 500 is in the mirror-down position, shown in FIG. 3A, has almost no variation in luminance between the areas on the light receiving surface, and hence the output values from the photometry sensor 23 are corrected using the output correction chart shown in FIG. 2A for uniform output correction. The correction value in FIG. 2A is a value of a1 which is set in advance.

In the state shown in FIG. 3B, the sub mirror 503 is arranged in the position (standby position) in which the sub mirror 503 is closed to the main mirror 501 in the mirror-down position and is overlaid thereon. At this time, the sub mirror holder 504 has been rotated in the mirror-up direction up to a position where the main mirror 501 and the sub mirror 503 are overlaid with each other substantially in parallel. Therefore, the object light flux having reached the main mirror 501 is all reflected by the main mirror 501 and the sub mirror 503 without being guided to the focus detection unit 31, and is guided to the pentaprism 22 through the focusing plate 25 and the field mask 26.

Therefore, the amount of light guided to the pentaprism 22 increases, whereby a finder image which can be checked by a photographer via the viewfinder eyepiece lens 18 becomes brighter, which improves object visibility, and facilitates manual focus adjustment. Further, the amount of light guided to the photometry sensor 23 also increases, and hence it is possible to improve the photometry accuracy under a low luminance environment.

When the sub mirror 503 is in the standby position shown in FIG. 3B, the object light flux guided from the sub mirror 503 to the pentaprism 22 increases by an amount which is not guided to the focus detection unit 31 as mentioned above, whereby the amount of light guided to the central portion of the photometry sensor 23 increases. As a result, the object light flux guided to the photometry sensor 23 is high in luminance in the central portion of the light receiving surface, and hence the output value from the photometry sensor 23 is corrected by using the output correction chart shown in FIG. 2B for reducing the output from the central portion of the photometry sensor 23. The correction values in FIG. 2B are set in advance such that the output value becomes stepwise smaller than α1 toward the central portion, as indicated by α2 to α4.

In the mirror-up position shown in FIG. 3C, the mirror unit 500 is retracted from the photographing optical path, and an object light flux having passed through the photographic lens 200 is guided to the image pickup device 33 to form an image, which is photoelectrically converted, without being guided to the viewfinder optical system 4 and the focus detection unit 31.

Figure 4:
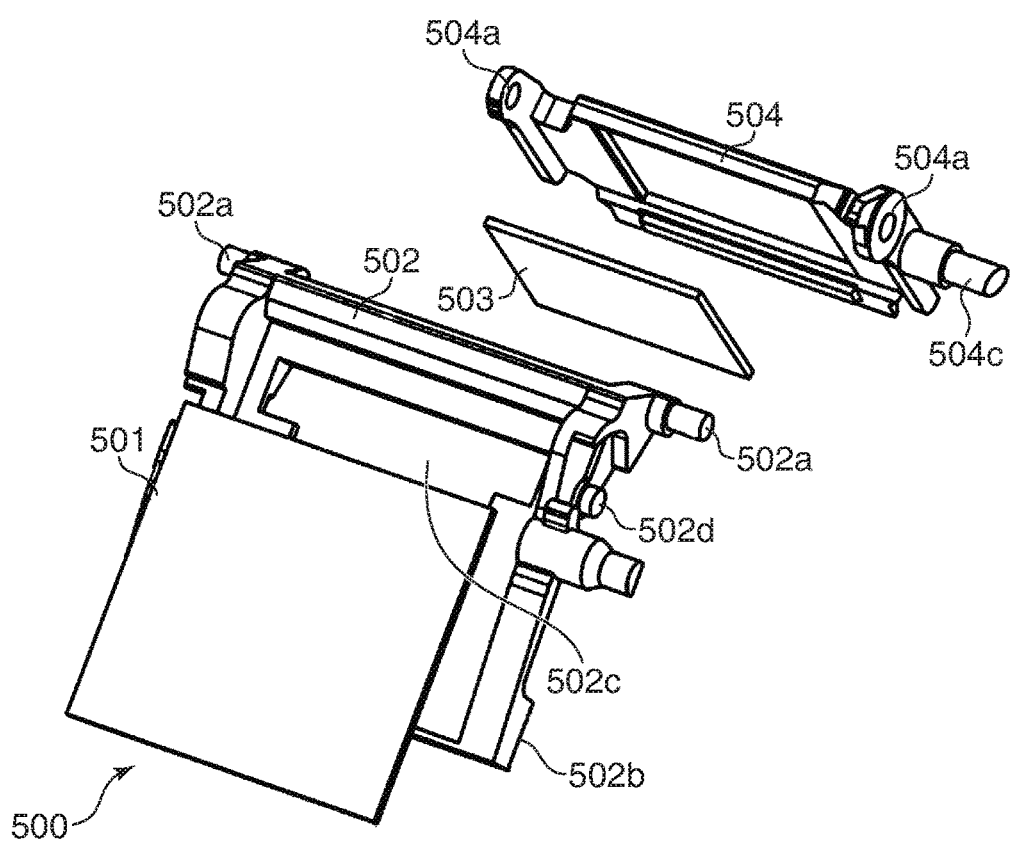
FIG. 4 is an exploded perspective view of a mirror unit.

FIG. 4 is an exploded perspective view of the mirror unit 500. As shown in FIG. 4, the main mirror holder 502 is formed with rotational shafts 502a and 502d, and the rotational shafts 502a are rotatably supported with respect to the mirror box 400. Further, the main mirror holder 502 is formed with an opening 502c, and an object light flux having passed through the main mirror 501 reaches the sub mirror 503 through the opening 502c.

The sub mirror holder 504 is formed with holes 504a, and is rotatably supported on the rotational shafts 502d of the main mirror holder 502 which are fitted in the holes 504a, respectively. Further, the sub mirror holder 504 is formed with a drive shaft 504c, and the driving force is transmitted from the mirror drive unit 101A to the drive shaft 504c to thereby rotate the sub mirror holder 504.

In the mirror-down state of the mirror unit 500, the sub mirror holder 504 is rotated toward the main mirror holder 502, whereby the sub mirror holder 504 is brought into contact with the main mirror holder 502 to thereby push up the main mirror holder 502. With this, a mirror-up operation is performed. On the other hand, from the mirror-up state of the mirror unit 500, the main mirror holder 502 is pulled down by the sub mirror holder 504, whereby a mirror-down operation is performed.

Here, the main mirror 501, the sub mirror 503, the main mirror holder 502, and the sub mirror holder 504 correspond to respective examples of a first mirror, a second mirror, a first mirror holder, and a second mirror holder, respectively. Further, the mirror-down position and the mirror-up position of the main mirror holder 502 correspond to respective examples of a first position and a second position. Further, the mirror-down position and the mirror-up position of the sub mirror holder 504 correspond to respective examples of a third position and a fourth position.

Figure 5A:
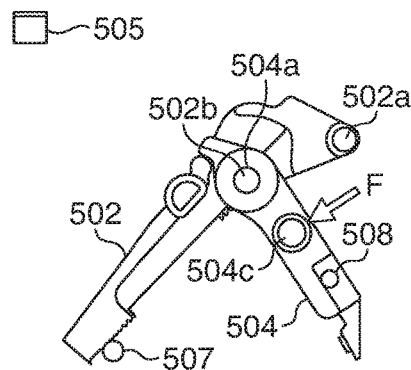
FIGS. 5A to 5F are schematic views useful in explaining operations of a main mirror holder and a sub mirror holder of the mirror unit.
Figure 5B:
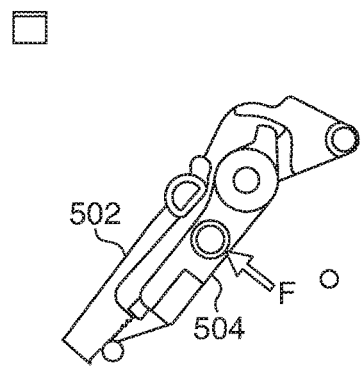
Figure 5C:
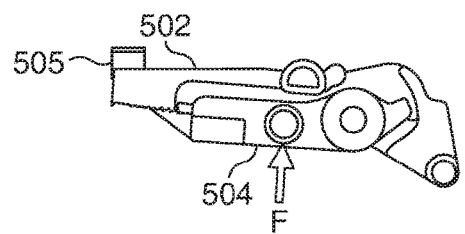
Figure 5D:
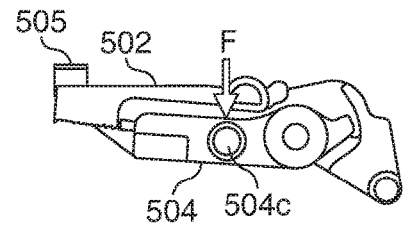
Figure 5E:
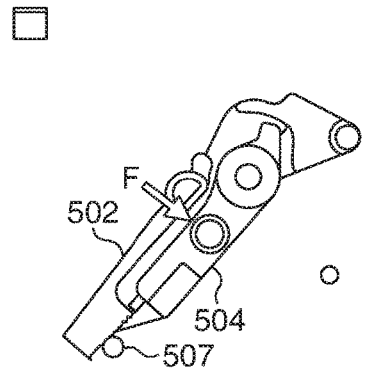
Figure 5F:
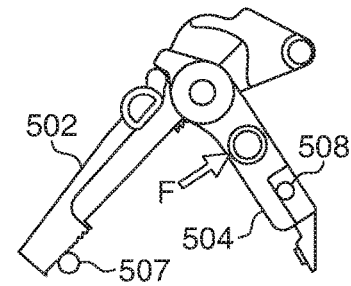

Next, a description will be given of the operation of the mirror unit 500 with reference to FIGS. 5A to 5F. FIGS. 5A and 5F are views showing a state in which the mirror unit 500 is in the mirror-down position, and FIGS. 5C and 5D are views showing a state in which the mirror unit 500 is in the mirror-up position. FIGS. 5B and 5E are views showing a state in which the sub mirror 503 is in the position (standby position) in which the sub mirror 503 is closed to the main mirror 501 in the mirror-down position and is overlaid thereon.

In the mirror-down state of the mirror unit 500, shown in FIG. 5A, the sub mirror holder 504 is in contact with a positioning shaft 508 disposed in the mirror box 400 in a state urged by a spring, not shown. Further, the main mirror holder 502 is held in the mirror-down state by being brought into in contact with a positioning shaft 507 disposed in the mirror box 400 in a state urged by a spring, not shown.

When the driving force is transmitted to the drive shaft 504c of the sub mirror holder 504 by the mirror drive unit 101A in a direction indicated by an arrow F in FIG. 5A, the sub mirror holder 504 is rotated about the rotational shafts 502b toward the main mirror holder 502. Then, the sub mirror holder 504 is rotated to the position in which the sub mirror holder 504 is closed to the main mirror holder 502 and is overlaid thereon, i.e. the position shown in FIG. 5B.

In the position shown in FIG. 5B, the sub mirror holder 504 is in contact with the main mirror holder 502, and an urging force applied at this time is only required to be a force which prevents the main mirror holder 502 from being separated from the positioning shaft 507. In this position, although details will be described hereinafter, the sub mirror holder 504 is on standby in a position (standby position) associated with each photometry mode. When the driving force is transmitted to the drive shaft 504c of the sub mirror holder 504 by the mirror drive unit 101A in the direction F in this state, the sub mirror holder 504 is rotated, whereby the main mirror holder 502 is pushed up. Then, the sub mirror holder 504 is rotated together with the main mirror holder 502 to the mirror-up position shown in FIG. 5C.

In the mirror-up position shown in FIG. 5C, the main mirror holder 502 is pushed against the stopper 505 provided in the mirror box 400 by the sub mirror holder 504, whereby the mirror unit 500 is held in the position retracted from the photographing optical path. When the driving force is transmitted to the drive shaft 504c of the sub mirror holder 504 by the mirror drive unit 101A in the direction F as shown in FIG. 5D, the mirror-down operation of the sub mirror holder 504 is started.

At this time, the main mirror holder 502 is moved down by a spring or a cam, not shown, connected to the sub mirror holder 504, simultaneously with the sub mirror holder 504. Then, the main mirror holder 502 is brought into contact with the positioning shaft 507, whereby the mirror unit 500 is shifted to a state shown in FIG. 5E, in which the sub mirror holder 504 is closed to the main mirror holder 502 and is overlaid thereon. In this state, the sub mirror holder 504 is on standby in the position associated with each photometry mode, similar to FIG. 5B.

When the driving force is transmitted to the drive shaft 504c of the sub mirror holder 504 by the mirror drive unit 101A in the direction F in the state shown in FIG. 5E, the sub mirror holder 504 is rotated in the mirror-down direction, and is brought into contact with the positioning shaft 508. With this, the sub mirror holder 504 returns to the mirror-down position (the same position in FIG. 5A) of the mirror unit 500, shown in FIG. 5F. Note that the configuration of the mirror drive unit that transmits the driving force to the drive shaft 504c of the sub mirror holder 504 is not particularly limited insofar as it can realize the operation of the mirror unit 500, shown in FIGS. 5A to 5F.

Next, a description will be given of the standby position of the sub mirror holder 504 associated with each photometry mode when the mirror unit 500 is in the intermediate position, with reference to FIGS. 6A to 6C. FIG. 6A shows the standby position of the sub mirror holder 504 in an evaluation photometry mode, FIG. 6B shows the standby position of the sub mirror holder 504 in a partial photometry mode, and FIG. 6C shows the standby position of the sub mirror holder 504 in a spot photometry mode. Note that in FIGS. 6A to 6C, the main mirror holder 502 and the sub mirror holder 504 are omitted from illustration, for convenience of explanation, and the description is given by referring to the main mirror 501 and the sub mirror 503.

In the evaluation photometry mode shown in FIG. 6A, an object light flux (A) having passed through the photographic lens 200 is reflected by the main mirror 501, and enters the pentaprism 22 through the focusing plate 25 and the field mask 26. Further, an object light flux (B) having been transmitted through the opening 502c of the main mirror holder 502 is reflected by the sub mirror 503, and then returns into the mirror box 400 again.

At this time, the sub mirror 503 is held in a position where the sub mirror 503 is opened through a predetermined angle θ1 from the main mirror 501 so as to prevent the object light flux (B) from entering an evaluation photometry range X on the focusing plate 25. If the object light flux (B) reflected by the sub mirror 503 enters the evaluation photometry range X, the luminance partially increases, whereby an error occurs in photometric value, and in this case, the photometric value is required to be corrected. If the photometric value is required to be corrected, a problem is caused, such as shortage of the capacity of a ROM due to addition of a calculation table, which considerably affects the product specifications.

A partial photometry range Y in the partial photometry mode shown in FIG. 6B is narrower than the evaluation photometry range X shown in FIG. 6A. Therefore, an angle θ2 formed by the sub mirror 503 with respect to the main mirror 501 can be made smaller than the angle θ1. Further, a spot photometry range Z in the spot photometry mode shown in FIG. 6C is even narrower than the partial photometry range Y shown in FIG. 6B. Therefore, an angle θ3 formed by the sub mirror 503 with respect to the main mirror 501 can be made still smaller than the angle θ2.

FIG. 7 is a flowchart of a control process for controlling the operation of the camera when a shutter time lag reduction mode is selected by operating the photographing mode-setting dial 14. The control process in FIG. 7 is performed e.g. by the MPU 100 loading a program stored in the storage section, such as the EEPROM 100a, into the RAM, not shown, and executing the same.

Referring to FIG. 7, in a step S501, when the shutter time lag reduction mode is selected by operating the photographing mode-setting dial 14, the MPU 100 determines whether the focus mode is set to the AF mode or the MF mode. If the focus mode is set to the AF mode, the MPU 100 proceeds to a step S502, whereas if the focus mode is set to the MF mode, the MPU 100 terminates the present process. In the step S502, the MPU 100 determines whether or not the AF mode is the one-shot AF mode, and if the AF mode is the one-shot AF mode, the MPU 100 proceeds to a step S503, whereas if the AF mode is not the one-shot AF mode (i.e. the AI focus AF mode or the AI servo AF mode), the MPU 100 terminates the present process.

In the step S503, the MPU 100 determines whether or not the release switch (SW1) 7a has been turned on, and if the release switch (SW1) 7a has been turned on, the MPU 100 proceeds to a step S504, whereas if the release switch (SW1) 7a has not been turned on for a predetermined time period, the MPU 100 terminates the present process. In the step S504, the MPU 100 causes the photometric circuit 24 to operate to thereby start photometry by the photometry sensor 23, and proceeds to a step S505.

In the step S505, the MPU 100 causes the focus detection circuit 102 to operate to start focus detection by the focus detection unit 31, and proceeds to a step S506. In the step S506, if it is determined by the focus detection unit 31 that an object image is in focus, the MPU 100 proceeds to a step S507, whereas if it is determined that the object image is not in focus, the MPU 100 performs focus detection again.

In the step S507, the MPU 100 causes the mirror drive circuit 101 to operate to rotate the sub mirror holder 504 in the mirror-up direction by the mirror drive unit 101A toward the main mirror holder 502 in the mirror-down position, and proceeds to a step S508. At this time, the sub mirror holder 504 is in the position (standby position) in which the sub mirror holder 504 is closed to the main mirror holder 502 in the mirror-down position and overlaid thereon (see FIG. 5B).

In the step S508, the MPU 100 determines whether or not the release switch (SW2) 7b has been turned on within a predetermined time period, and if the release switch (SW2) 7b has been turned on, the MPU 100 proceeds to a step S509, whereas if not, the MPU 100 proceeds to a step S510.

In the step S509, the MPU 100 causes the mirror drive unit 101A to rotate the sub mirror holder 504 from the standby position in the mirror-up direction to thereby place the mirror unit 500 in the mirror-up position (see FIG. 5C), and proceeds to a step S511. In the step S510, the MPU 100 determines whether or not the release switch (SW1) 7a is off. Then, if the release switch (SW1) 7a is not off, the MPU 100 returns to the step S505 to wait with the sub mirror holder 504 held in the standby position, and whereas if the release switch (SW1) 7a is off, the MPU 100 proceeds to a step S514.

In the step S511, the MPU 100 performs a series of photographing operations, such as pickup of an object image to the image pickup device 33 and known image processing performed by the video signal processing circuit 104, and proceeds to a step S512. In the step S512, the MPU 100 causes the mirror drive unit 101A to rotate the sub mirror holder 504 together with the main mirror holder 502 in the mirror-down direction to thereby return the sub mirror holder 504 to the standby position (see FIG. 5E), and proceeds to a step S513.

In the step S513, the MPU 100 determines whether or not the release switch (SW1) 7a is off. Then, if the release switch (SW1) 7a is not off, but remains on, the MPU 100 returns to the step S508 to perform on/off determination of the release switch (SW2) 7b, whereas if the release switch (SW1) 7a is off, the MPU 100 proceeds to the step S514.

In the step S514, the MPU 100 causes the mirror drive unit 101A to rotate the sub mirror holder 504 from the standby position in the mirror-down direction to thereby return the mirror unit 500 to the mirror-down position (see FIG. 5F), followed by terminating the present process.

As described above, in the present embodiment, when the mirror unit 500 is in the mirror-down position, the sub mirror holder 504 is rotated to the standby position in the vicinity of the position of the main mirror holder 502 after focusing, and is held there in advance. This makes it possible to reduce the time required for the sub mirror holder 504 to move to the position of the main mirror holder 502 when the mirror-up operation is performed, whereby it is possible to reduce the release time lag. Further, in the case of continuous photographing in the one-shot AF mode, the sub mirror holder 504 is rotated to the standby position after photographing, and hence it is also possible to reduce the time required for the sub mirror holder 504 to move to the mirror-down position when the mirror-down operation is performed.

Next, a description will be given of a first variation of the control process in FIG. 7.

Figure 8:
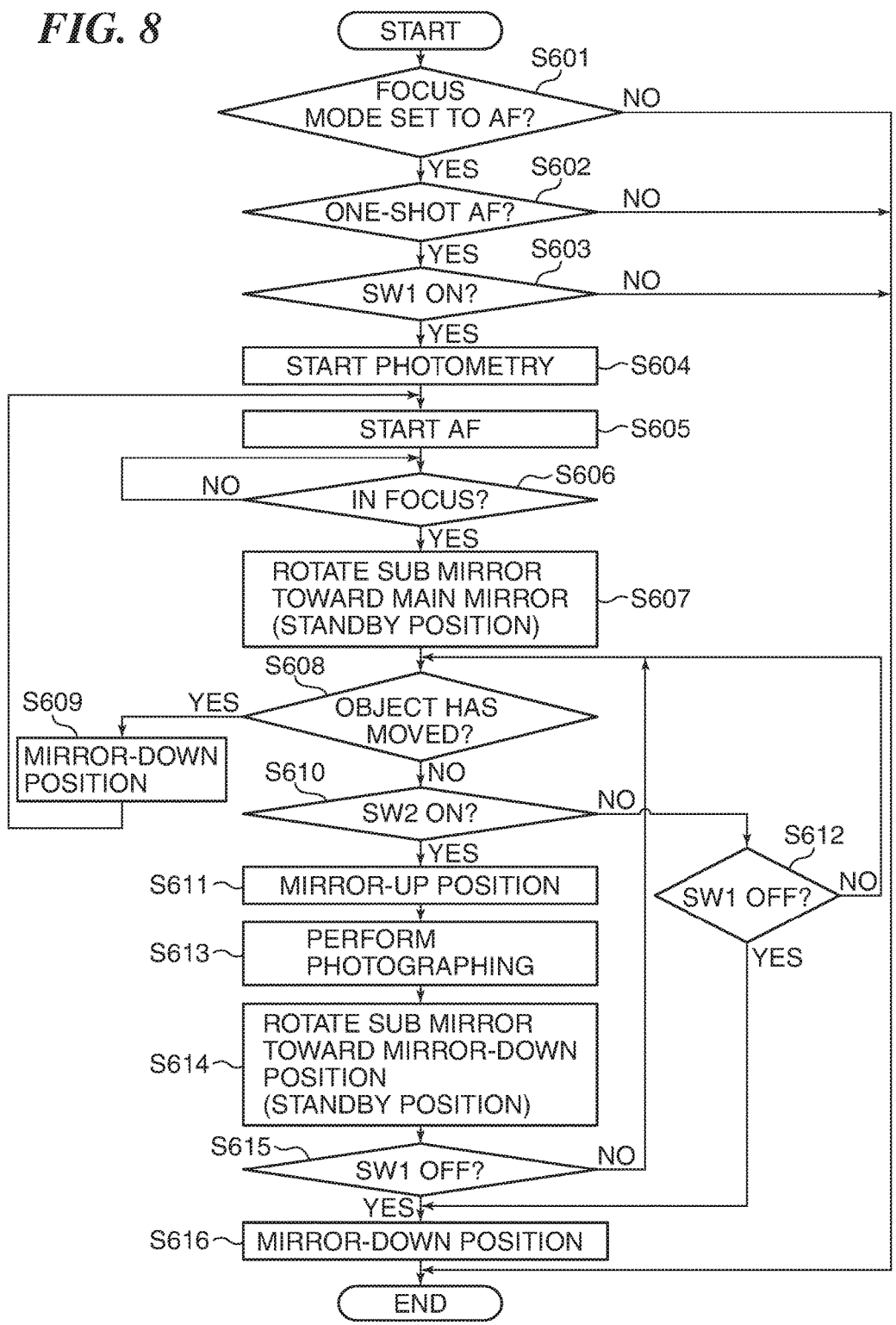
FIG. 8 is a flowchart of a first variation of the control process in FIG. 7.

FIG. 8 is a flowchart of the first variation of the control process. The process in FIG. 8 is performed e.g. by the MPU 100 loading a program stored in the storage section, such as the EEPROM 100a, into the RAM, not shown, and executing the same. Note that steps S601 to S607, and S610 to S616 in FIG. 8 are the same as the steps S501 to S507, and S508 to S514 in FIG. 7, respectively, and hence the description is given only of steps S608 and S609 in FIG. 8.

Referring to FIG. 8, in the step S608, the MPU 100 determines whether or not an object has moved after the sub mirror holder 504 has been rotated to the standby position in the step S607 before the release switch (SW2) 7b is turned on in the step S610. In this determination, the mirror unit 500 is not in the mirror-down position (FIG. 5A), and the sub mirror holder 504 is in the standby position (FIG. 5B), and hence the object movement determination cannot be performed by the focus detection unit 31. Therefore, the object movement determination is performed by the photometry sensor 23 using a known object recognition technique. Then, if the object has moved, i.e. if the amount of movement of the object is larger than a predetermined value, the MPU 100 determines that focusing has been affected by the movement of the object, and proceeds to the step S609, whereas if the object has not moved, i.e. if the amount of movement of the object is not larger than the predetermined value, the MPU 100 determines that focusing remains unaffected by the movement of the object, and proceeds to the step S610.

In the step S609, the MPU 100 causes the mirror drive unit 101A to rotate the sub mirror holder 504 from the standby position in the mirror-down direction to thereby shift the mirror unit 500 to the mirror-down state (see FIG. 5A), and then returns to the step S605, wherein focus detection is performed again.

As described above, in the present embodiment, it is determined whether or not the object has moved, and if the object has moved, the sub mirror holder 504, which has been rotated to the standby position in advance after focus detection, is returned to the mirror-down position, and focus detection is performed again. This makes it possible to prevent focusing from remaining affected by the movement of the object.

Figure 9:
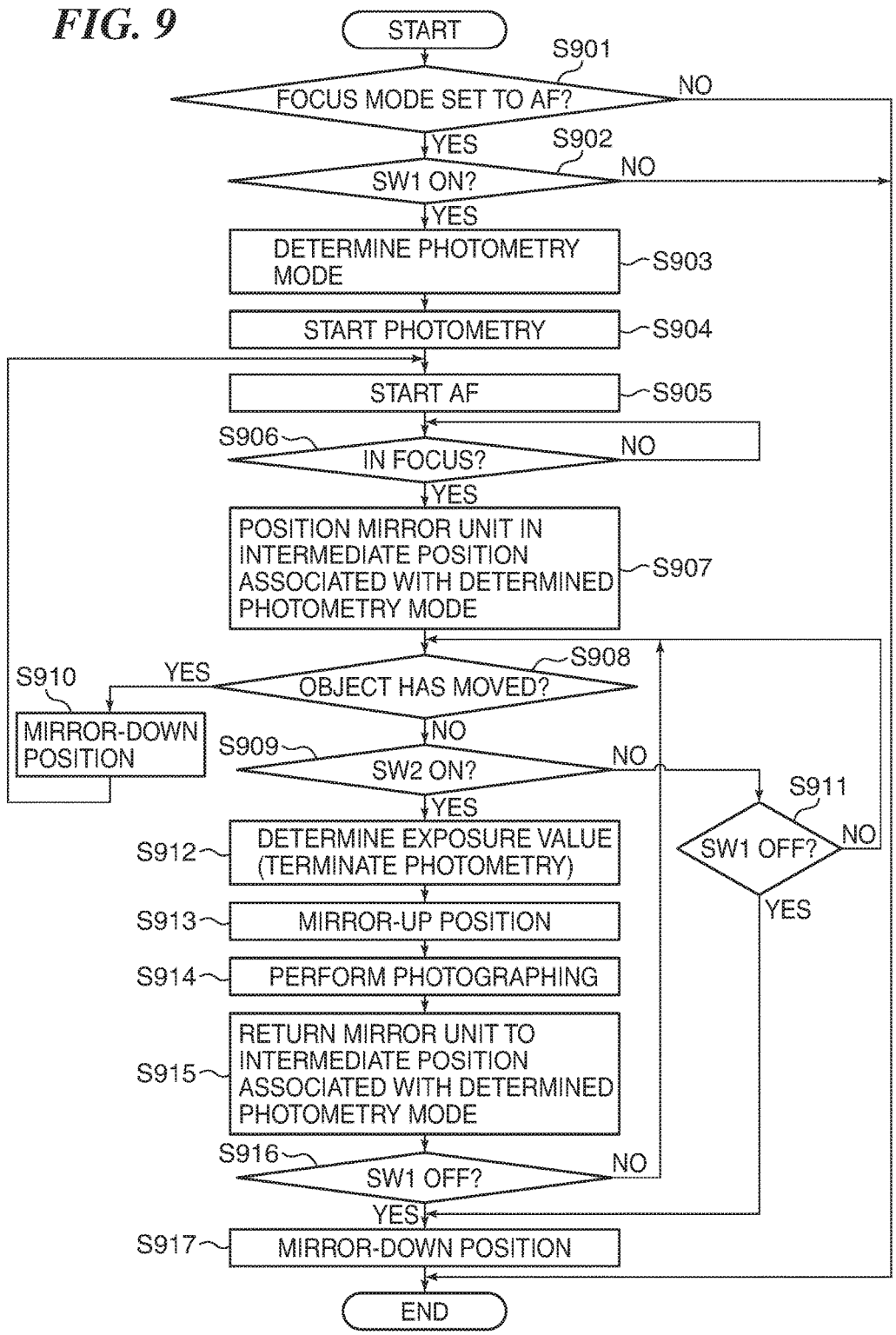
FIG. 9 is a flowchart of a second variation of the control process in FIG. 7.

Next, a description will be given of a second variation of the control process in FIG. 7. FIG. 9 is a flowchart of the second variation of the control process. The second variation differs from the first variation only in that determination of the one-shot AF mode is not performed, but determination of the photometry mode is performed to thereby perform processing according to the determined photometry mode. Therefore, the following description is given of the point different from the control process in FIG. 8 as the first variation, and description of steps corresponding to those in FIG. 8 is omitted.

In the control process in FIG. 9, if it is determined in a step S901 that the focus mode is set to the AF mode, the MPU 100 proceeds to a step S902, and if the release switch (SW1) 7a is turned on, the MPU 100 proceeds to a step S903. In the step S903, the MPU 100 determines which one of the evaluation photometry mode, the partial photometry mode, and the spot photometry mode is selected, and proceeds to a step S904.

In the steps S904 to S906, the MPU 100 performs the same processing as in the steps S604 to S606 in FIG. 8, and if it is determined by the focus detection unit 31 in the step S906 that the object image is in focus, the MPU 100 proceeds to a step S907, wherein the MPU 100 causes the mirror drive circuit 101 to operate to thereby cause the mirror drive unit 101A to rotate the sub mirror holder 504 to a predetermined position in the mirror-up direction according to the photometry mode determined in the step S903, and proceeds to a step S908. At this time, the sub mirror holder 504 is rotated to one of the standby positions shown in FIGS. 5B and 5E with respect to the main mirror holder 502.

In the steps S908 and S909, the MPU 100 performs the same processing as in the steps S608 to S610 in FIG. 8, and if it is determined in the step S909 that the release switch (SW2) 7b has been turned on within the predetermined time period, the MPU 100 proceeds to a step S912, wherein the MPU 100 determines an exposure value based on a photometric value detected when the release switch (SW2) 7b has been turned on, thereby terminating photometry, and proceeds to a step S913. By continuing photometry until immediately before photographing, it is possible to perform photographing with a more accurate exposure value. In the step S913 and a step S914, the MPU 100 performs the same processing as in the steps S611 and S613 in FIG. 8, and proceeds to a step S915, wherein the MPU 100 causes the mirror drive unit 101A to rotate the sub mirror holder 504 in the mirror-down direction to thereby return the mirror unit 500 to the intermediate position (FIG. 5E) associated with the photometry mode, and proceeds to a step S916 corresponding to the step S615 in FIG. 8.

As described above, in the present embodiment, when the mirror unit 500 is in the mirror-down position, the sub mirror holder 504 is rotated to the standby position in the vicinity of the position of the main mirror holder 502 after focusing, and held there in advance. At this time, the standby position of the sub mirror holder 504 with respect to the main mirror holder 502 is controlled to be positioned at an angle which does not affect photometry, according to the photometry mode.

This makes it possible to reduce the time required for the sub mirror holder 504 to move to the position of the main mirror holder 502 in the mirror-up operation without unnecessarily calculating correction values for the photometric values, whereby it is possible to further reduce the release time lag. Further, in the mirror-down operation after photographing, it is also possible to reduce the time required for the sub mirror holder 504 to move from adjacent to the position of the main mirror holder 502 in the mirror-down position to the mirror-down position of the sub mirror holder 504.

Figure 10:
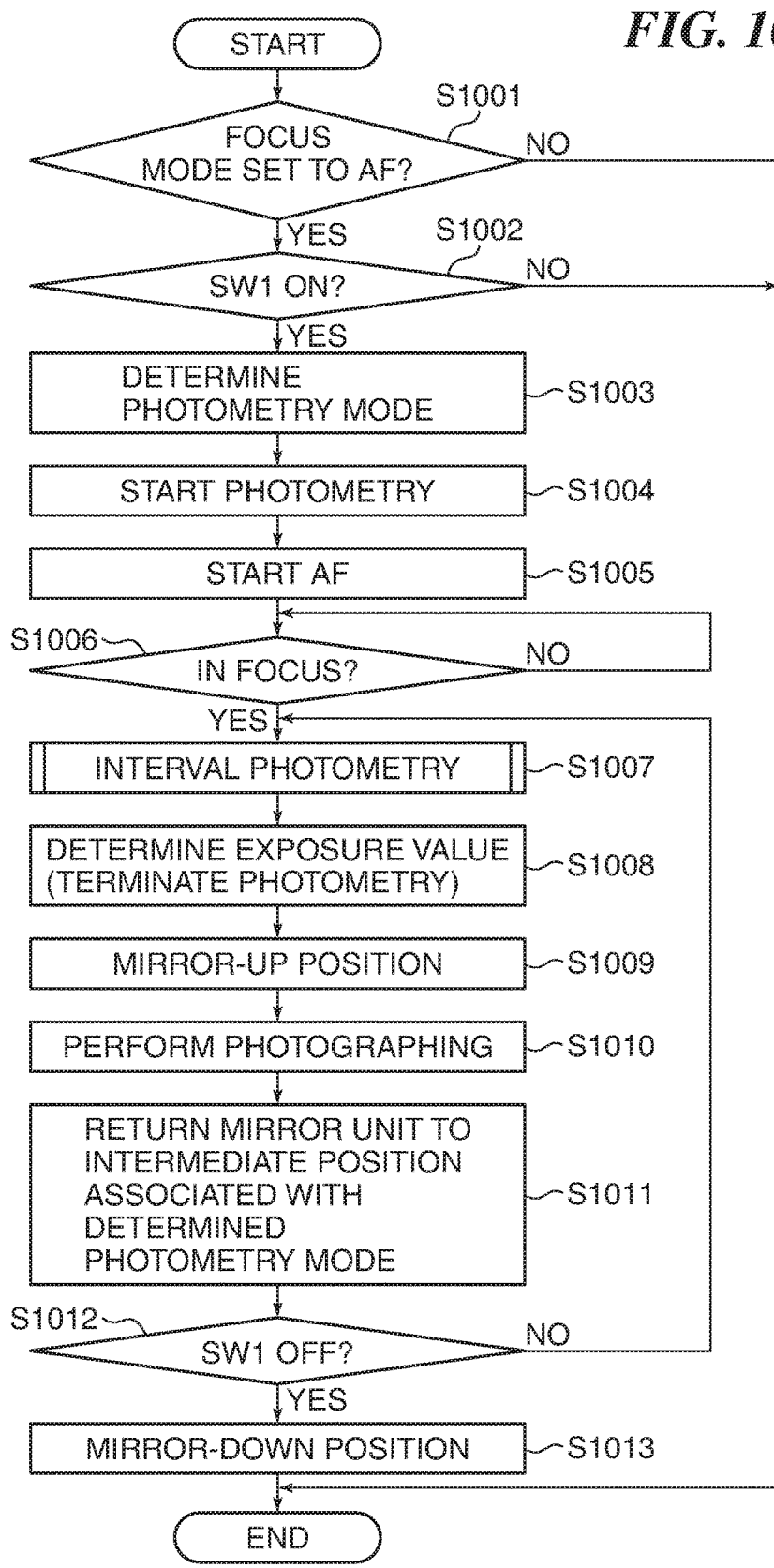
FIG. 10 is a flowchart of a third variation of the control process in FIG. 7.

Next, a description will be given of a third variation of the control process in FIG. 7. FIG. 10 is a flowchart of the third variation of the control process. The third variation differs from the second variation only in that the steps S907 to S911 are omitted, and in place of these steps, when it is determined in a step S1006 corresponding to the step S906 that the object image is in focus, an interval photometry process is newly performed in a step S1007, and then the MPU 100 proceeds to a step S1008 corresponding to the step S912, and hence the following description is given only of the step S1007 in FIG. 10 with reference to FIGS. 10 and 11.

Referring to FIG. 10, if it is determined by the focus detection unit 31 in the step S1006 that the object image is in focus, the MPU 100 proceeds to the step S1007. In the step S1007, the MPU 100 causes the photometric circuit 24 to start to perform the interval photometry process for repeating on/off of photometry at fixed intervals (e.g. at every one second). The following description is given of the interval photometry process with reference to FIG. 11.

Figure 11:
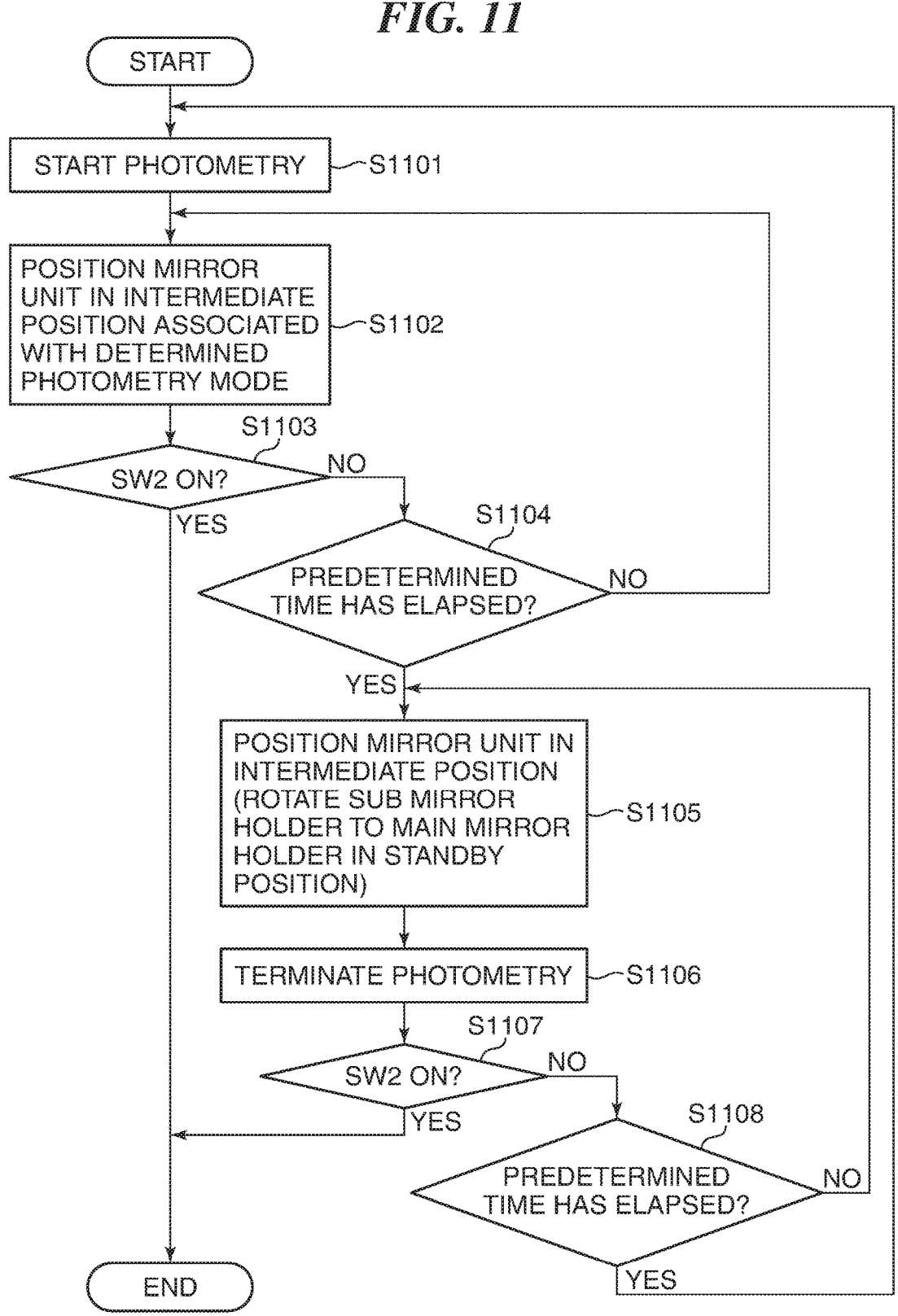
FIG. 11 is a flowchart of an interval photometry process in a step in FIG. 10.

Referring to FIG. 11, in a step S1101, the MPU 100 causes the photometric circuit 24 to start photometry by the photometry sensor 23, and proceeds to a step S1102. In the step S1102, the MPU 100 causes the mirror drive circuit 101 to operate the mirror drive unit 101A to thereby rotate the sub mirror holder 504 in the mirror-up direction to a predetermined position according to the photometry mode determined in the step S1003 in FIG. 10, and proceeds to a step S1103. At this time, the sub mirror holder 504 is rotated to one of the positions (standby position) shown in FIGS. 5B and 5E with respect to the main mirror holder 502.

In the step S1103, the MPU 100 determines whether or not the release switch (SW2) 7b has been turned on, and if the release switch (SW2) 7b has been turned on, the MPU 100 terminates the present process, and proceeds to the step S1008 in FIG. 10, whereas if the release switch (SW2) 7b remains off, the MPU 100 proceeds to a step S1104. In the step S1104, the MPU 100 determines whether or not time measured by the time measurement circuit 109 indicates that a predetermined time period (e.g. one second) has elapsed. Then, if the predetermined time period has not elapsed, the MPU 100 returns to the step S1102, whereas if the predetermined time has elapsed, the MPU 100 proceeds to a step S1105.

In the step S1105, the MPU 100 causes the mirror drive unit 101A to rotate the sub mirror holder 504 in the mirror-up direction to thereby bring the sub mirror holder 504 into contact with the main mirror holder 502, and proceeds to a step S1106. At this time, the sub mirror holder 504 is overlaid on the main mirror holder 502 by eliminating a space between the sub mirror holder 504 and the main mirror holder 502, and hence the time required for the sub mirror holder 504 to rotate in the mirror-up operation is reduced by an amount corresponding to this space. This makes it possible to reduce the time lag before starting the photographing operation in a step S1010 in FIG. 10.

In the step S1106, the MPU 100 causes the photometric circuit 24 to temporarily terminate photometry by the photometry sensor 23, and proceeds to a step S1107. In this step, since the sub mirror 503 is in the state closed to the main mirror 501 in the step S1105, photometry is temporarily terminated to thereby prevent occurrence of an error in the photometric value due to entry of light reflected by the sub mirror 503 into the photometry sensor 23.

In the step S1107, the MPU 100 determines whether or not the release switch (SW2) 7b has been turned on, and if the release switch (SW2) 7b has been turned on, the MPU 100 terminates the present process, and proceeds to the step S1008 in FIG. 10, whereas if not, the MPU 100 proceeds to a step S1108. In the step S1108, the MPU 100 determines whether or not time measured by the time measurement circuit 109 after execution of the step S1105 indicates that a predetermined time period (e.g. one second) has elapsed. Then, if the predetermined time period has not elapsed, the MPU 100 returns to the step S1105, whereas if the predetermined time has elapsed, the MPU 100 returns to the step S1101, and starts photometry again.

As described above, in the present embodiment, the interval photometry is employed, and a space between the sub mirror holder 504 in the standby position and the main mirror holder 502 is eliminated when photometry is off, and hence the time required for the sub mirror holder 504 to rotate is reduced by the amount corresponding to the space. This makes it possible to reduce the time lag before starting the photographing operation. The other configuration and advantageous effects are the same as described as to the third variation.

Figure 12:
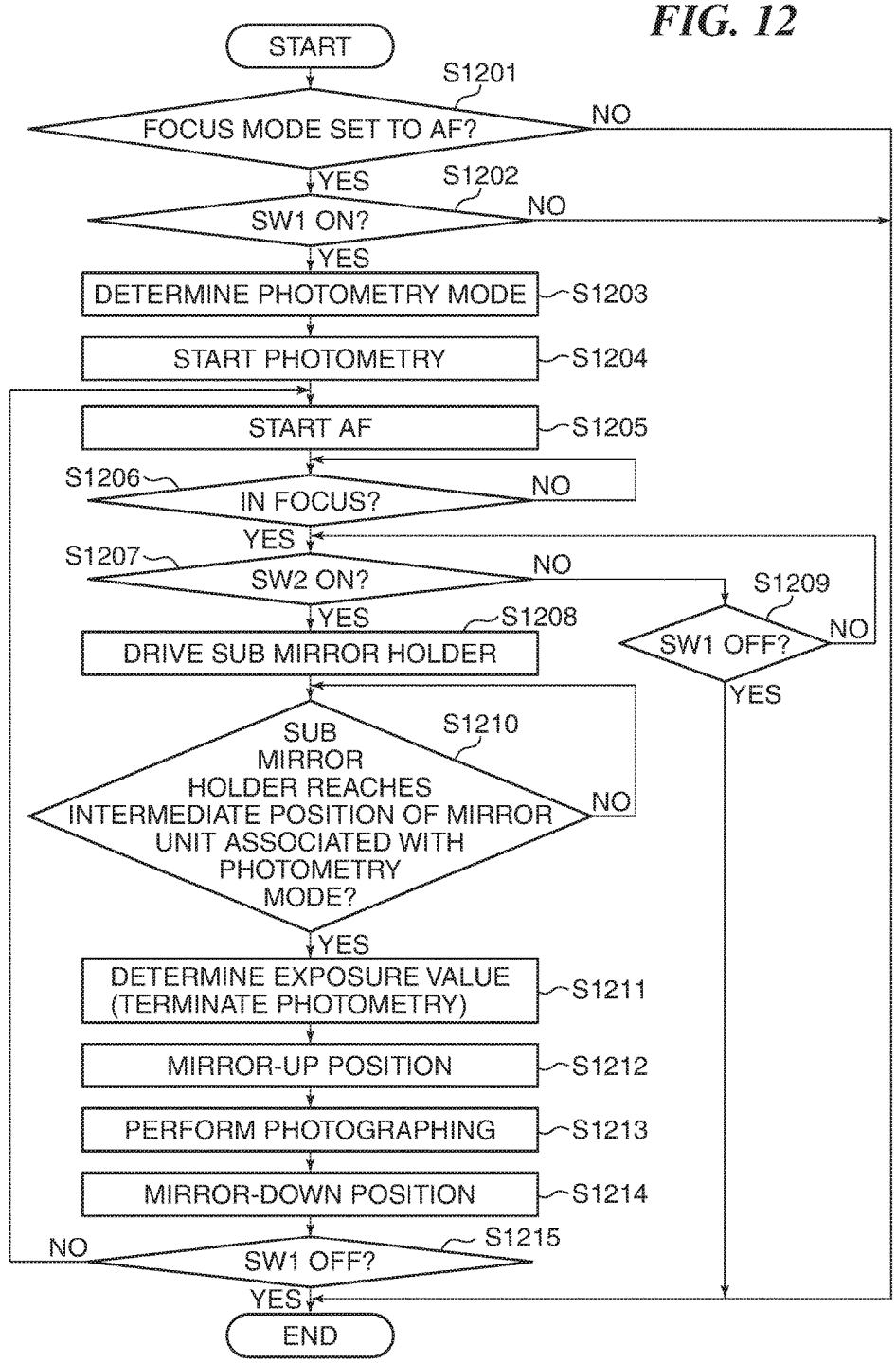
FIG. 12 is a fourth variation of the control process in FIG. 7.

Next, a description will be given of a fourth variation of the control process in FIG. 7. FIG. 12 is a flowchart of the fourth variation of the control process. Steps 1201 to S1206 in FIG. 12 are the same as in the steps S901 to S906 in FIG. 9, and hence description thereof is omitted.

Referring to FIG. 12, in a step S1207, the MPU 100 determines whether or not the release switch (SW2) 7b has been turned on within a predetermined time period set in advance, and if the release switch (SW2) 7b has been turned on, the MPU 100 proceeds to a step S1208, whereas if not, the MPU 100 proceeds to a step S1209.

In the step S1209, the MPU 100 determines whether or not the release switch (SW1) 7a has been turned off. Then, if the release switch (SW1) 7a has not been turned off, the MPU 100 returns to the step S1207 to perform on/off determination on the release switch (SW2) 7b, whereas if the release switch (SW1) 7a has been turned off, the MPU 100 terminates the present process.

Upon receipt of an on signal from the release switch (SW2) 7b, in the step S1208, the MPU 100 causes the mirror drive unit 101A to start driving of the sub mirror holder 504 in the mirror-up direction, and proceeds to a step S1210.

In the step S1210, the MPU 100 determines whether or not the sub mirror holder 504 has been rotated to a predetermined position (the standby position shown in FIG. 5B or 5E) according to the photometry mode determined in the step S1203.

The determination of the rotational position of the sub mirror holder 504 in this step uses a known method, such as a method of detecting a position by using a stepping motor for the mirror drive motor and detecting pulses, or a method of detecting a position using a phase plate. Then, if it is determined that the sub mirror holder 504 has been rotated to the predetermined position, the MPU 100 proceeds to a step S1211, whereas if not, the MPU 100 waits until the sub mirror holder 504 reaches the predetermined position.

In the step S1211, the MPU 100 determines an exposure value based on photometric values detected when it is determined in the step S1210 that the sub mirror holder 504 has been rotated to the predetermined position, thereby terminating photometry, and proceeds to a step S1212.

In the step S1212, the MPU 100 causes the mirror drive unit 101A to rotate the sub mirror holder 504 in the mirror-up direction to thereby place the mirror unit 500 in the mirror-up position (see FIG. 5C), and proceeds to a step S1213.

In the step S1213, the MPU 100 performs the series of photographing operations, such the pickup of an object image to the image pickup device 33 and the known image processing by the video signal processing circuit 104, and proceeds to a step S1214. In the step S1214, the MPU 100 causes the mirror drive unit 101A to rotate the sub mirror holder 504 in the mirror-down direction to thereby return the mirror unit 500 to the mirror-down position (see FIG. 5F), and proceeds to a step S1215.

In the step S1215, the MPU 100 determines whether or not the release switch (SW1) 7a has been turned off. Then, if the release switch (SW1) 7a has not been turned off, the MPU 100 returns to the step S1205 to perform focusing determination, whereas if the release switch (SW1) 7a has been turned off, the MPU 100 terminates the present process.

As described above, in the present embodiment, the sub mirror holder 504 is driven to the standby position after the release switch (SW2) 7b is turned on, photometry is performed during the series of photographing operations up to the end of photographing, and the exposure value is determined immediately before photographing. This makes it possible to reduce the release time lag, and perform photographing with an accurate exposure. The other configuration and advantageous effects are the same as described as to the first embodiment.

Figure 13:
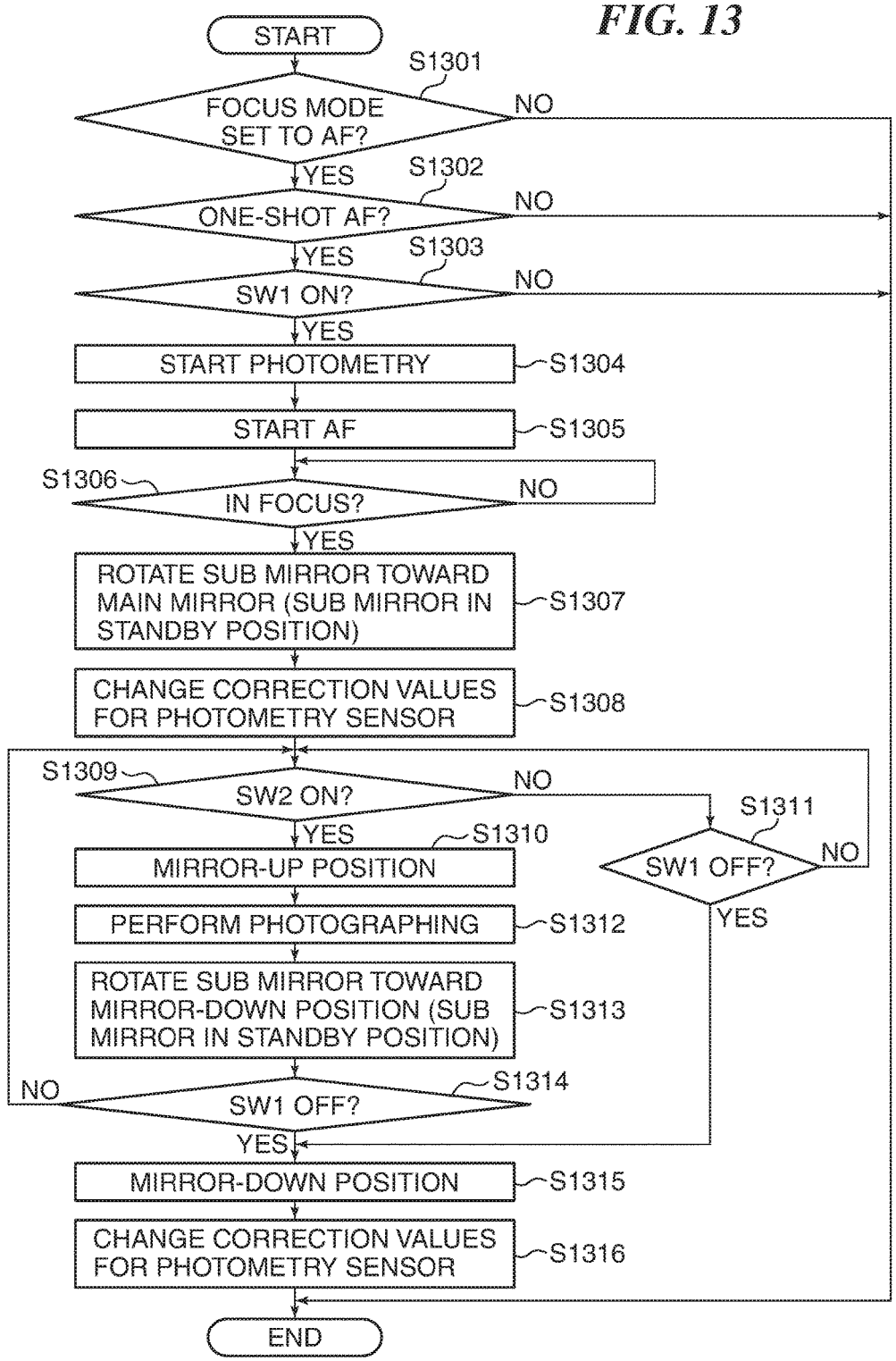
FIG. 13 is a flowchart of a fifth variation of the control process in FIG. 7.

Next, a description will be given of a fifth variation of the control process in FIG. 7. FIG. 13 is a flowchart of the fifth variation of the control process. The fifth variation in FIG. 13 differs from the control process in FIG. 7 only in that processing for changing the correction values for the output from the photometry sensor is added, and is the same as the control process in FIG. 7 in the other respects, and hence the following description is given only of a step S1308 following a step S1307 corresponding to the step S507 in FIG. 7, and a step S1316 following a step S1315 corresponding to the step S514 in FIG. 7.

In the step S1307, the MPU 100 causes the mirror drive circuit 101 to operate the mirror drive unit 101A to thereby rotate the sub mirror holder 504 in the mirror-up direction until the sub mirror holder 504 is brought into contact with the main mirror holder 502 in the mirror-down position, and proceeds to the step S1308. In this step, the sub mirror holder 504 is in the position (standby position) in which the sub mirror holder 504 is closed to the main mirror holder 502 in the mirror-down position and is overlaid thereon (see FIG. 5B). Further, the amount of light guided to the photometry sensor 23 varies during rotation of the sub mirror holder 504, and hence the MPU 100 holds the photometric value obtained before the sub mirror holder 504 is rotated until termination of the rotation.

In the step S1308, the MPU 100 changes the output correction chart from FIG. 2A to FIG. 2B so as to correct the output values from the photometry sensor 23, and proceeds to a step S1309.

In the step S1315, the MPU 100 causes the mirror drive unit 101A to rotate the sub mirror holder 504 from the standby position in the mirror-down direction to thereby return the mirror unit 500 to the mirror-down position (FIG. 5F), and proceeds to the step S1316. In the step S1316, the MPU 100 changes the output correction chart from FIG. 2B to FIG. 2A so as to correct the output values from the photometry sensor 23, followed by terminating the present process.

As described above, in the fifth variation of the control process according to the present embodiment, when the sub mirror holder 504 is rotated to the position of the main mirror holder 502 and held there in advance after finishing focus detection, the output values from the photometry sensor 23 are corrected. This makes it possible to reduce the time required for the sub mirror holder 504 to move to the position of the main mirror holder 502 in the mirror-up operation without affecting the photometric values, and as a result, it is possible to reduce the release time lag by reducing the mirror driving time.

Figure 14:
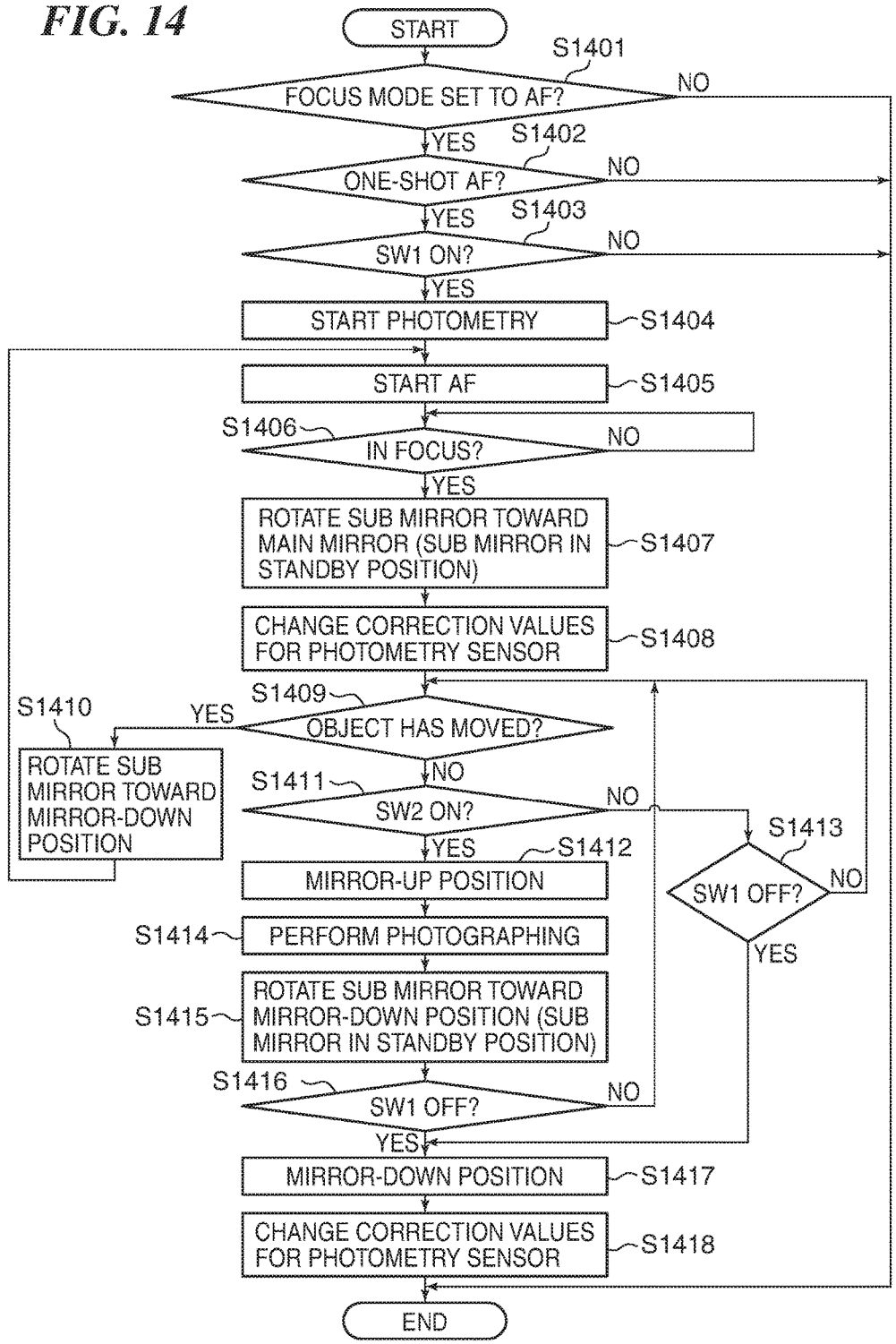
FIG. 14 is a flowchart of a sixth variation of the control process in FIG. 7.

Next, a description will be given of a sixth variation of the control process in FIG. 7. FIG. 14 is a flowchart of the sixth variation of the control process. The sixth variation in FIG. 14 differs from the control process in FIG. 8 only in that processing for changing the correction value for the output from the photometry sensor is added, and is the same as the control process in FIG. 8 in the other respects. That is, the same processing as in the step S1308 in FIG. 13 is performed in a step S1408 following a step S1407 corresponding to the step S607 in FIG. 8, and the same processing as in the step S1316 in FIG. 13 is performed in a step S1418 following a step S1417 corresponding to the step S616 in FIG. 8.

As described above, differently from the fifth variation, in the sixth variation, it is determined whether or not an object has moved, and if the object has moved, the sub mirror holder 504 which has been rotated to the standby position in advance after focus detection is returned to the mirror-down position, and focus detection is performed again. This makes it possible to prevent focusing from remaining affected by the movement of the object. The other configuration and advantageous effects are the same as described as to the fifth variation.

Figure 15:
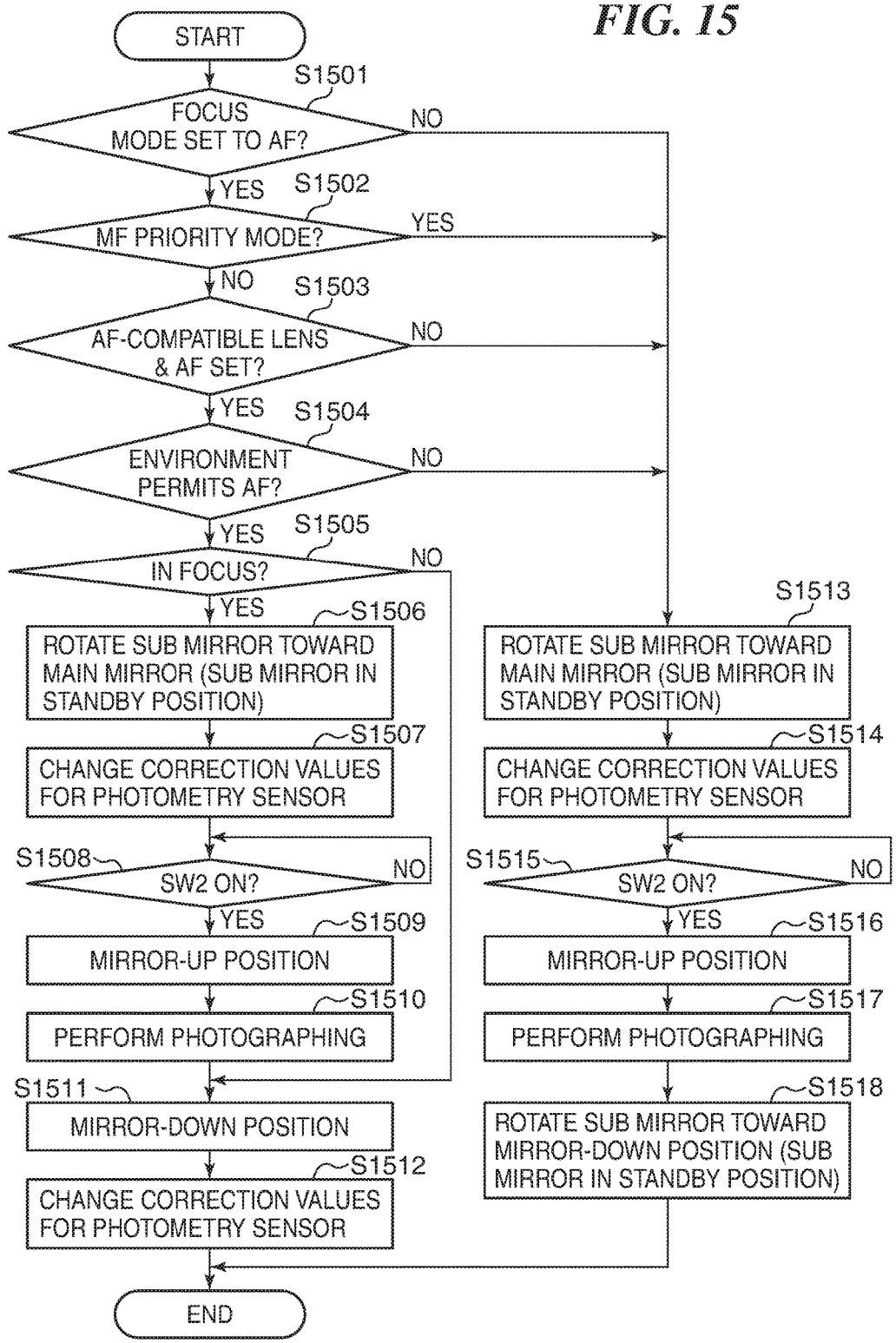
FIG. 15 is a flowchart of a seventh variation of the control process in FIG. 7.

Next, a description will be given of a seventh variation of the control process in FIG. 7. FIG. 15 is a flowchart of the seventh variation of the control process.

Referring to FIG. 15, in a step S1501, when the shutter time lag reduction mode is selected by operating the photographing mode-setting dial 14, the MPU 100 determines whether the focus mode set by using the focus mode-changing switch 45 is the AF mode or the MF mode. Then, if the focus mode is set to the AF mode, the MPU 100 proceeds to a step S1502, whereas if the focus mode is set to the MF mode, the MPU 100 proceeds to a step S1513.

In the step S1513, the MPU 100 causes the mirror drive circuit 101 to operate the mirror drive unit 101A to thereby rotate the sub mirror holder 504 in the mirror-up direction until the sub mirror holder 504 is brought into contact with the main mirror holder 502 in the mirror-down position, and proceeds to a step S1514. At this time, the sub mirror holder 504 is in the position (standby position) in which the sub mirror holder 504 is closed to the main mirror holder 502 in the mirror-down position and is overlaid thereon (see FIG. 5B).

In the step S1502, the MPU 100 determines whether or not the camera mode set e.g. by the photographing mode-setting dial 14 is an MF priority mode. Then, if the MF priority mode is set, the MPU 100 proceeds to the step S1513, whereas if not, the MPU 100 proceeds to a step S1503.

Here, examples of the MF priority mode include a watching mode, an MF priority macro photographing mode, and so forth. The watching mode is a mode in which the digital single-lens reflex camera is used like a telescope. In the state in which the sub mirror holder 504 is rotated to the standby position (see FIG. 5B), a finder image having high visibility can be provided, and hence the watching mode can be used e.g. for bird watching and sports game-watching by combining this mode with the use of a bright telephoto lens.

The MF priority macro photographing mode is a mode used when performing so-called close-up photographing. Although the MF operation is not necessarily performed when performing close-up photographing, there are many cases where focusing is not properly performed by AF, and hence it is effective to facilitate focus adjustment by a manual operation. In these MF priority modes, the MF operation is basically performed. Note that for example, in a case where an AF instruction operation is performed by a photographer, the sub mirror holder 504 may be returned from the standby position to the mirror-down position to perform the focusing operation based on a result of detection performed by the focus detection unit 31, and then the sub mirror holder 504 may be rotated to the standby position again.

In the step S1503, the MPU 100 determines, by communicating with the lens unit 210 via the mount contact point 21, whether or not an AF-compatible lens is mounted and AF is set. Then, if an AF-compatible lens is mounted and AF is set, the MPU 100 proceeds to a step S1504, whereas if not, the MPU 100 proceeds to the step S1513.

If the answer to the question of the step S1503 is negative (NO), there can be assumed a case where an MF-dedicated lens is mounted on the camera body 1, or an AF-compatible lens which is set to MF is mounted on the same. The MF-dedicated lens includes an old model lens which is not compatible with AF, a special lens for swing and tilt photographing, and the like.

In the step S1504, the MPU 100 determines whether or not the camera is in a luminance environment allowing AF to be performed based e.g. on a result of photometry output from the photometry sensor 23. Then, if the camera is in a luminance environment allowing AF, the MPU 100 proceeds to a step S1505, whereas if the camera is not in a luminance environment lower in luminance than the lower limit luminance for AF, the MPU 100 determines that the camera is in a luminance environment not allowing AF, the MPU 100 proceeds to the step S1513. Although in this case, it can be expected that the photometric result is sometimes momentarily lowered, it is preferable to perform control so as to ignore momentary lowering of the luminance.

In the step S1514, the MPU 100 changes the output correction chart from FIG. 2A to FIG. 2B so as to correct the output value from the photometry sensor 23, and then proceeds to a step S1515, wherein if the release switch (SW2) 7b has been turned on, the MPU 100 proceeds to a step S1516. In the step S1516, the MPU 100 causes the mirror drive unit 101A to rotate the sub mirror holder 504 from the standby position in the mirror-up direction to thereby place the mirror unit 500 in the mirror-up position (see FIG. 5C), and then proceeds to a step S1517.

In the step S1517, the MPU 100 performs the series of photographing operations, such as the pickup of an object image to the image pickup device 33 and the known image processing by the video signal processing circuit 104, and proceeds to a step S1518. In the step S1518, the MPU 100 causes the mirror drive unit 101A to rotate the sub mirror holder 504 together with the main mirror holder 502 in the mirror-down direction to thereby return the sub mirror holder 504 to the standby position (FIG. 5E), followed by terminating the present process.

On the other hand, in the step S1505, the MPU 100 causes the focus detection circuit 102 to start focus detection by the focus detection unit 31, and if it is determined that an object image is in focus, the MPU 100 proceeds to a step S1506, whereas if it is determined that the object is not in focus, the MPU 100 proceeds to a step S1511. In the step S1506 and steps S1507 to S1510, the MPU 100 performs the same processing as in the above-described steps S1513 to S1517 and after performing the series of photographing operations in the step S1510, the MPU 100 proceeds to the step S1511.

In the step S1511, MPU 100 causes the mirror drive unit 101A to rotate the sub mirror holder 504 together with the main mirror holder 502 from the mirror-up position in the mirror-down direction to thereby return the mirror unit 500 to the mirror-down position (FIG. 5F), and then proceeds to a step S1512. In the step S1512, the MPU 100 changes the output correction chart from FIG. 2B to FIG. 2A so as to correct the output values from the photometry sensor 23, followed by terminating the present process. This is because, normally, after the photographing operations have been performed, the in-focus state is released to enable an AF operation for a next photographing operation.

As described above, in the present embodiment, even in a case where the focus mode is set to the MF mode, it is possible to correct the output values from the photometry sensor 23 when the sub mirror holder 504 is rotated to the position of the main mirror holder 502 and held there in advance. The other configuration and advantageous effects are the same as described as to the fifth variation.

Figure 16:
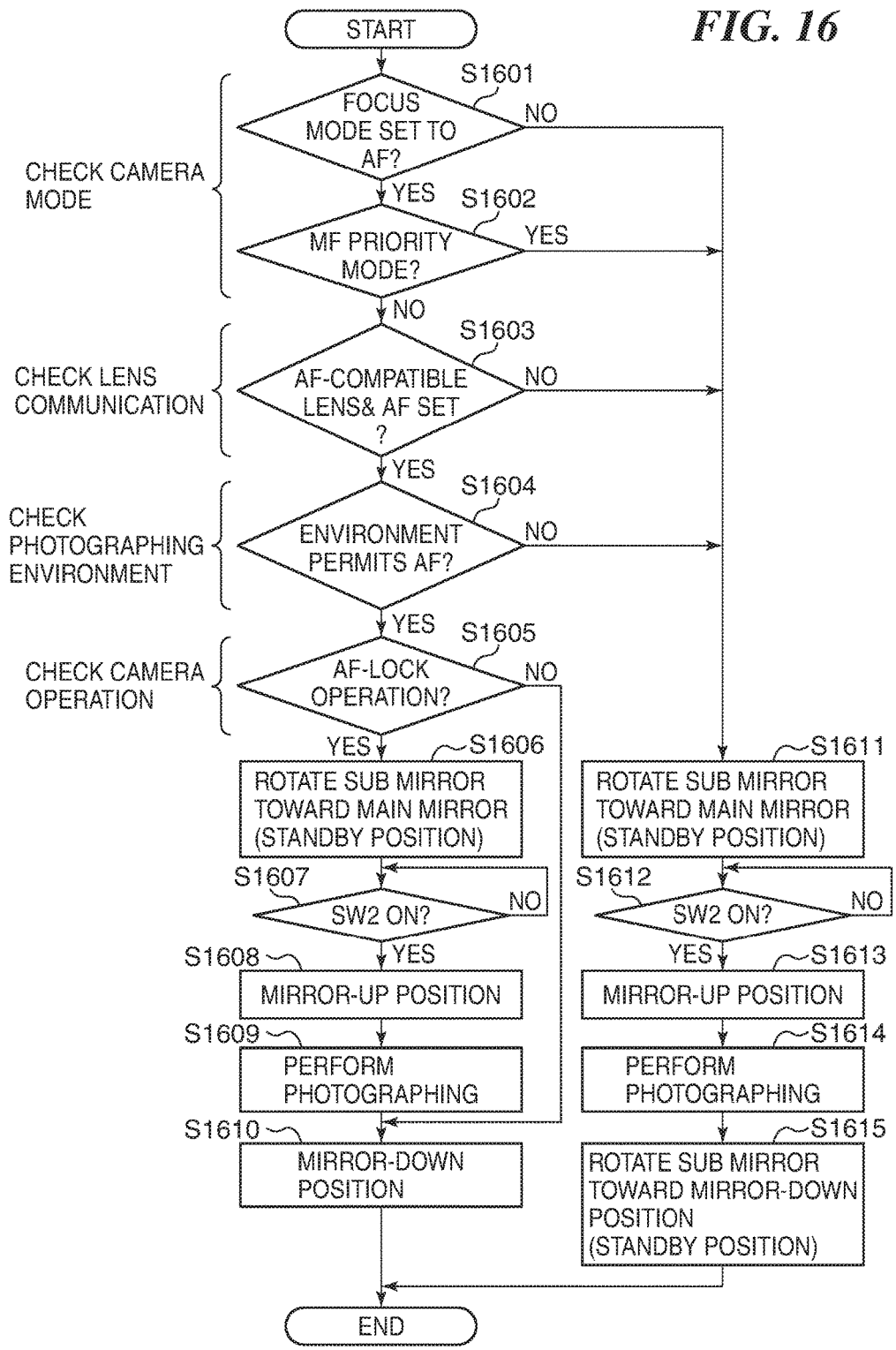
FIG. 16 is a flowchart of an eighth variation of the control process in FIG. 7.

Next, a description will be given of an eighth variation of the control process in FIG. 7. FIG. 16 is a flowchart of the eighth variation of the control process. The eighth variation in FIG. 16 differs from the seventh variation in FIG. 15 only in that AF-lock operation determination is performed in a step S1605 in place of the focus determination in the step S1505, and processing for changing the correction values for the output from the photometry sensor is not performed, and hence the following description is given of the step S1605.

If it is determined in a step S1604 corresponding to the step S1504 in FIG. 15 that the camera is in an environment permits AF, the MPU 100 proceeds to the step S1605, wherein the MPU 100 determines whether or not the AF-lock operation has been performed by the AF-lock instruction member 46, and if the AF-lock operation has been performed, the MPU 100 proceeds to a step S1606 corresponding to the step S1506 in FIG. 15, whereas if not, the MPU 100 proceeds to a step S1610 corresponding to the step S1511 in FIG. 15. The AF lock operation refers to an operation performed by a photographer, for determining and fixing an in-focus position.

As described above, in the present embodiment, the sub mirror 503 is placed in the standby position in which the sub mirror 503 is closed to the main mirror 501 in the mirror-down position and is overlaid thereon during finder observation in a case where the focus detection function is not used (in a case where the AF-lock operation for determining and fixing an in-focus position is performed by a photographer). This makes it possible to increase the amount of light guided to the pentaprism 22 by causing an object light flux to be reflected by the main mirror 501 and the sub mirror 503 to thereby make a finder image brighter. As a result, the object visibility is improved, which facilitates manual focus adjustment, and the amount of light guided to the photometry sensor 23 is increased, whereby it is possible to improve the accuracy of photometry under a low luminance environment.

Figure 17:
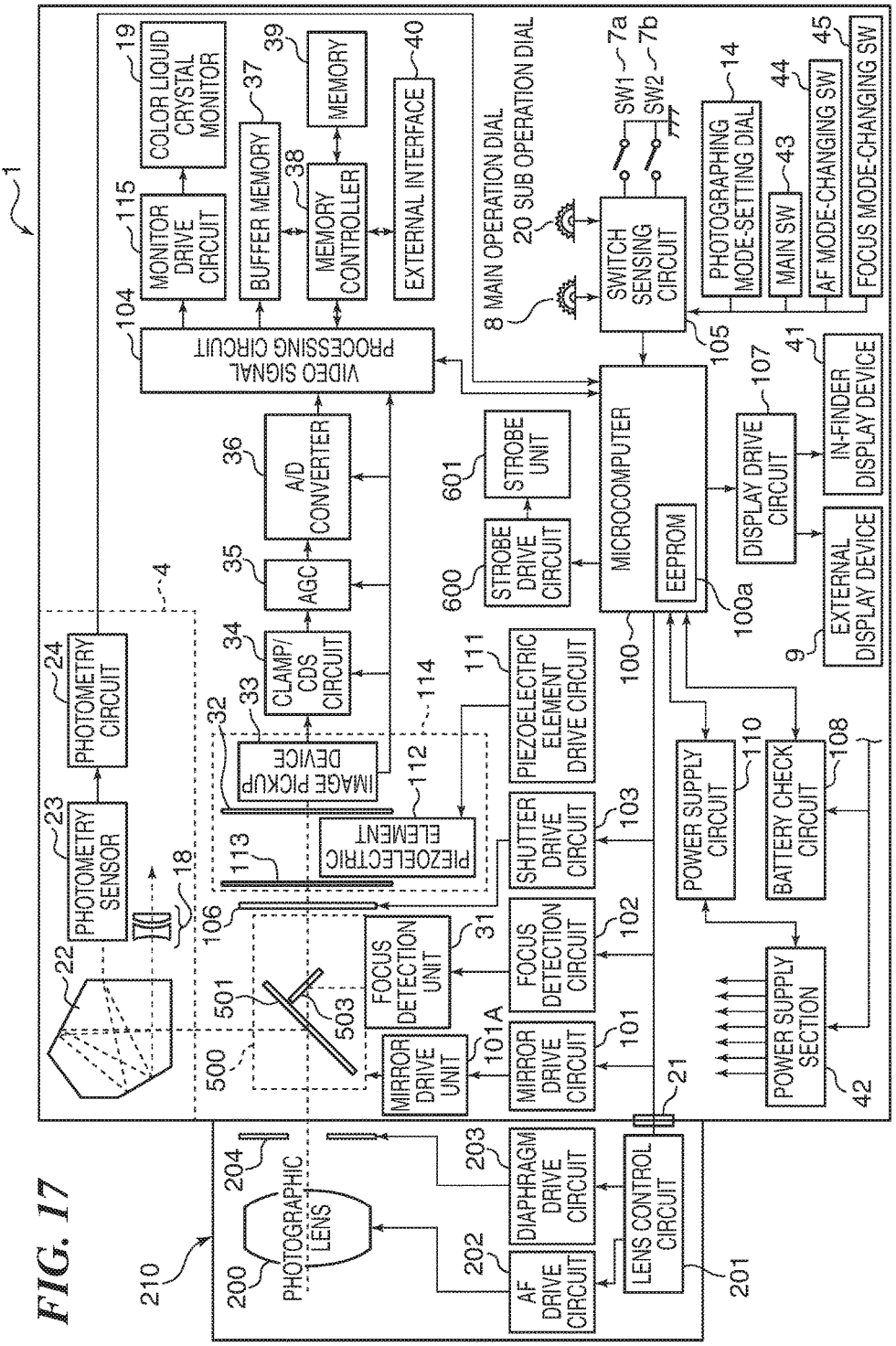
FIG. 17 is a system block diagram of a digital single-lens reflex camera as an image pickup apparatus according to a second embodiment of the present invention.

Next, a description will be given of a second embodiment of the present invention. FIG. 17 is a system block diagram of a digital single-lens reflex camera as an image pickup apparatus according to the second embodiment of the present invention. The system (hardware) of the camera as the image pickup apparatus according to the second embodiment differs from the system (hardware) of the camera as the image pickup apparatus according to the first embodiment in that a strobe drive circuit 600 and a strobe unit 601 are provided in place of the time measurement circuit 109. Components corresponding to those of the first embodiment are denoted by the same reference numerals, and description thereof is omitted. Note that the time measurement circuit 109 may remain provided.

Referring to FIG. 17, in the second embodiment, the strobe drive circuit 600 is also connected to the MPU 100. The strobe drive circuit 600 is connected to the strobe unit 601 to drive the same.

The photometry sensor 23 detects part of a photographing light flux by the light receiving elements which are divided in association with the areas on the observation surface. The photometric circuit 24 converts output values from the photometry sensor 23 to luminance signals of the respective areas on the observation surface, and outputs the luminance signals to the MPU 100. The MPU 100 calculates an exposure value based on the luminance signals output from the photometric circuit 24. Further, when performing final strobe light emission, the MPU 100 calculates an amount of light necessary for the final strobe light emission based on the luminance signals output from the photometric circuit 24 during preliminary strobe light emission.

The strobe drive circuit 600 includes a capacitor for causing the strobe unit 601 to emit light, and controls the strobe unit 601 such that it emits a final strobe light emission amount of light calculated by the MPU 100. The strobe unit 601 includes a xenon tube, a reflective umbrella, a Fresnel panel, and so forth, and emits light by obtaining electric power from the capacitor of the strobe drive circuit 600 to thereby irradiate an object with strobe light. Here, the strobe unit 601 corresponds to an example of a light emission section, and the strobe drive circuit 600 corresponds to an example of a light emission drive unit. Note that a light source of the strobe unit 601 is not limited to the xenon tube, but may be a light source which can continuously emit light, such as an LED.

Figure 18A:
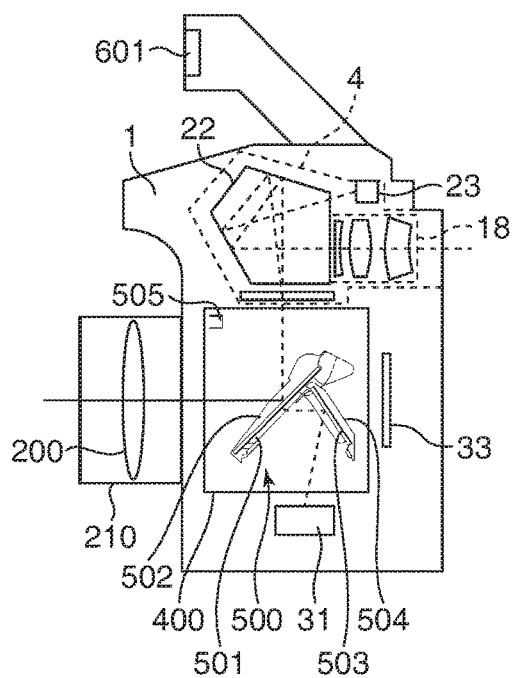
FIGS. 18A to 18C are schematic side cross-sectional views of the digital single-lens reflex camera shown in FIG. 17.
Figure 18B:
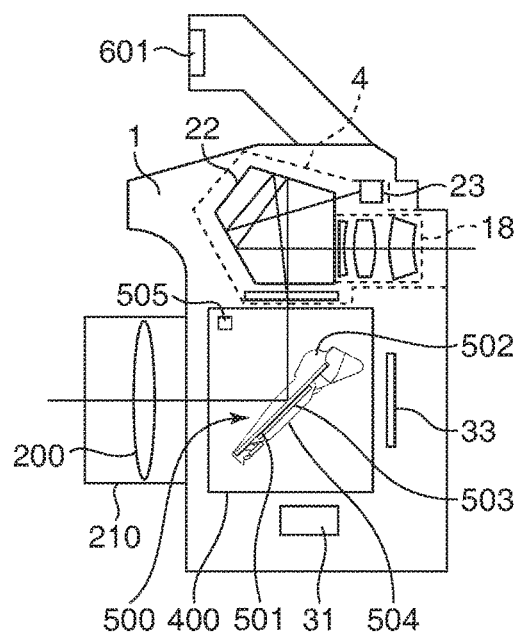
Figure 18C:
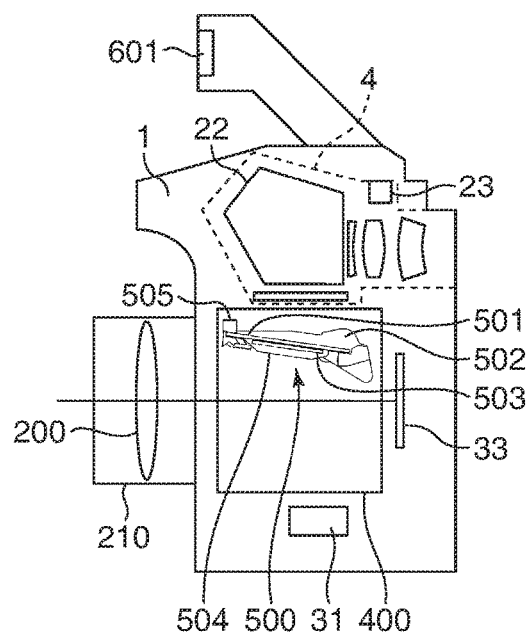

FIGS. 18A to 18C are schematic side cross-sectional views of the digital single-lens reflex camera shown in FIG. 17. Compared with the camera according to the first embodiment shown in FIGS. 3A to 3C, as shown in FIGS. 18A to 18C, the strobe unit 601 is added in the second embodiment. Further, the configuration and operations described in the first embodiment with reference to FIGS. 4 and 5A to 5F are the same in the present embodiment, and hence the following description is given with reference to the same drawings as deemed appropriate.

Figure 19:
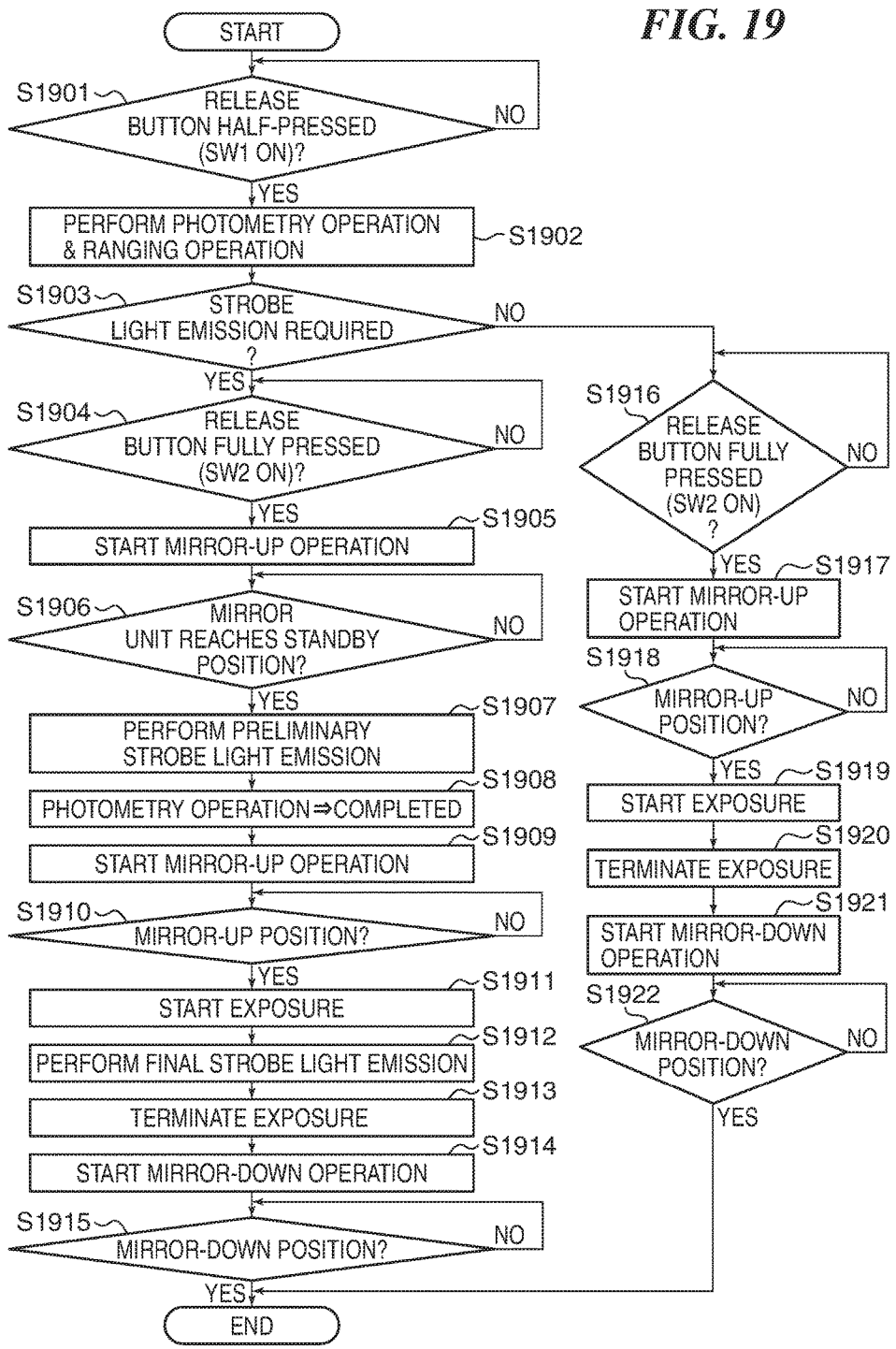
FIG. 19 is a flowchart of a control process for controlling the operation of the digital single-lens reflex camera shown in FIG. 17.

FIG. 19 is a flowchart of a control process for controlling the operation of the camera when the shutter time lag reduction mode is selected by operating the photographing mode-setting dial 14. The control process in FIG. 19 is performed e.g. by the MPU 100 loading a program stored in the storage section, such as the EEPROM 100a, into the RAM, not shown, and executing the same.

Referring to FIG. 19, if the release switch (SW1) 7a is turned on in a step S1901, the MPU 100 causes the photometry sensor 23 and the focus detection unit 31 to perform the photometry operation and the focus detection operation, respectively, and proceeds to a step S1903. In the step S1903, the MPU 100 determines whether or not strobe light emission is required, based on a result of photometry obtained in the step S1902, and if it is determined that strobe light emission is required, the MPU 100 proceeds to a step S1904, whereas if not, the MPU 100 proceeds to a step S1916.

In the step S1904, if the release switch (SW2) 7b is turned on, the MPU 100 proceeds to a step S1905. In the step S1905, the MPU 100 causes the mirror drive circuit 101 to operate the mirror drive unit 101A to thereby rotate the sub mirror holder 504 in the mirror-up direction toward the main mirror holder 502 in the mirror-down position, and proceeds to a step S1906.

In the step S1906, the MPU 100 determines whether or not the sub mirror holder 504 has reached the position (standby position) in which the sub mirror holder 504 is closed to the main mirror holder 502 in the mirror-down position and is overlaid thereon, and if the sub mirror holder 504 has reached the standby position, the MPU 100 proceeds to a step S1907. In the step S1907, the MPU 100 causes the strobe drive circuit 600 to operate the strobe unit 601 to thereby perform preliminary light emission, and proceeds to a step S1908. By performing the preliminary light emission in this step, a light flux which has been reflected by an object and has passed the photographic lens 200 is reflected by the main mirror 501 and the sub mirror 503 of the mirror unit 500 in the standby position, and is guided to the photometry sensor 23 via the viewfinder optical system 4.

In the step S1908, the MPU 100 causes the photometry sensor 23 to perform photometry during the preliminary light emission from the strobe unit 601, and calculates a light amount necessary for final strobe light emission (final strobe light emission amount) based on luminance signals output from the photometric circuit 24, thereby terminating the photometry operation, and proceeds to a step S1909.

In the step S1909, the MPU 100 causes the mirror drive unit 101A to rotate the sub mirror holder 504 from the standby position in the mirror-up direction, and proceeds to a step S1910. In the step S1910, the MPU 100 determines whether or not the sub mirror holder 504 has reached the mirror-up position (see FIG. 5C), and if the sub mirror holder 504 has reached the mirror-up position, the MPU 100 proceeds to a step S1911.

In the step S1911, the MPU 100 controls the focal plane shutter 106 such that the front curtain is caused to travel to start exposure to the image pickup device 33, and proceeds to a step S1912. In the step S1912, the MPU 100 causes the strobe drive circuit 600 to operate the strobe unit 601 to thereby perform final light emission by emitting the final strobe light emission amount of light calculated in the step S1908, and proceeds to a step S1913. In the step S1913, the MPU 100 controls the focal plane shutter 106 such that a rear curtain is caused to travel, thereby terminating exposure to the image pickup device 33, and proceeds to a step S1914.

In the step S1914, the MPU 100 causes the mirror drive unit 101A to rotate the sub mirror holder 504 together with the main mirror holder 502 in the mirror-down direction, and proceeds to a step S1915. In the step S1915, the MPU 100 determines whether or not the mirror unit 500 has reached the mirror-down position (FIG. 5F), and if the mirror unit 500 has reached the mirror-down position, the MPU 100 terminates the present process, and holds the mirror unit 500 in the mirror-down position until the next photographing operation is started.

On the other hand, the step S1916 to a step S1922 to be executed after it is determined in the step S1903 that strobe light emission is not required are the same as in the steps S1904, S1905, S1910, S1911, and S1913 to S1915, and hence description thereof is omitted.

As described above, in the present embodiment, the sub mirror holder 504 in the mirror-down position is rotated to the standby position in the vicinity of the main mirror holder 502 after focusing, and held there, and preliminary strobe light emission is performed in this state. Therefore, a light flux reflected by both of the main mirror 501 and the sub mirror 503 is guided to the photometry sensor 23, and hence the amount of light guided to the photometry sensor 23 increases.

As a result, it is possible to determine an accurate final strobe light emission amount by efficiently performing photometry with a smaller preliminary strobe light emission amount than the prior art, which makes it possible to select a capacitor small in capacity and size for the strobe drive circuit 600. Further, it is also possible to reduce electric power used for preliminary strobe light emission, compared with the prior art, and hence the time for charging electric power used for preliminary strobe light emission and final light emission can be reduced, which increases the speed of continuous photographing which requires strobe light emission.

Further, in the present embodiment, it is possible to reduce the time required for the sub mirror holder 504 to move to the mirror-up position after preliminary light emission. This makes it possible to reduce the release time lag, and in a case where an object is a person, it is possible to perform the photographing operation before the person closes his/her eyes in response to preliminary light emission, which makes it possible to reduce the number of failure photographs.

Figure 20:
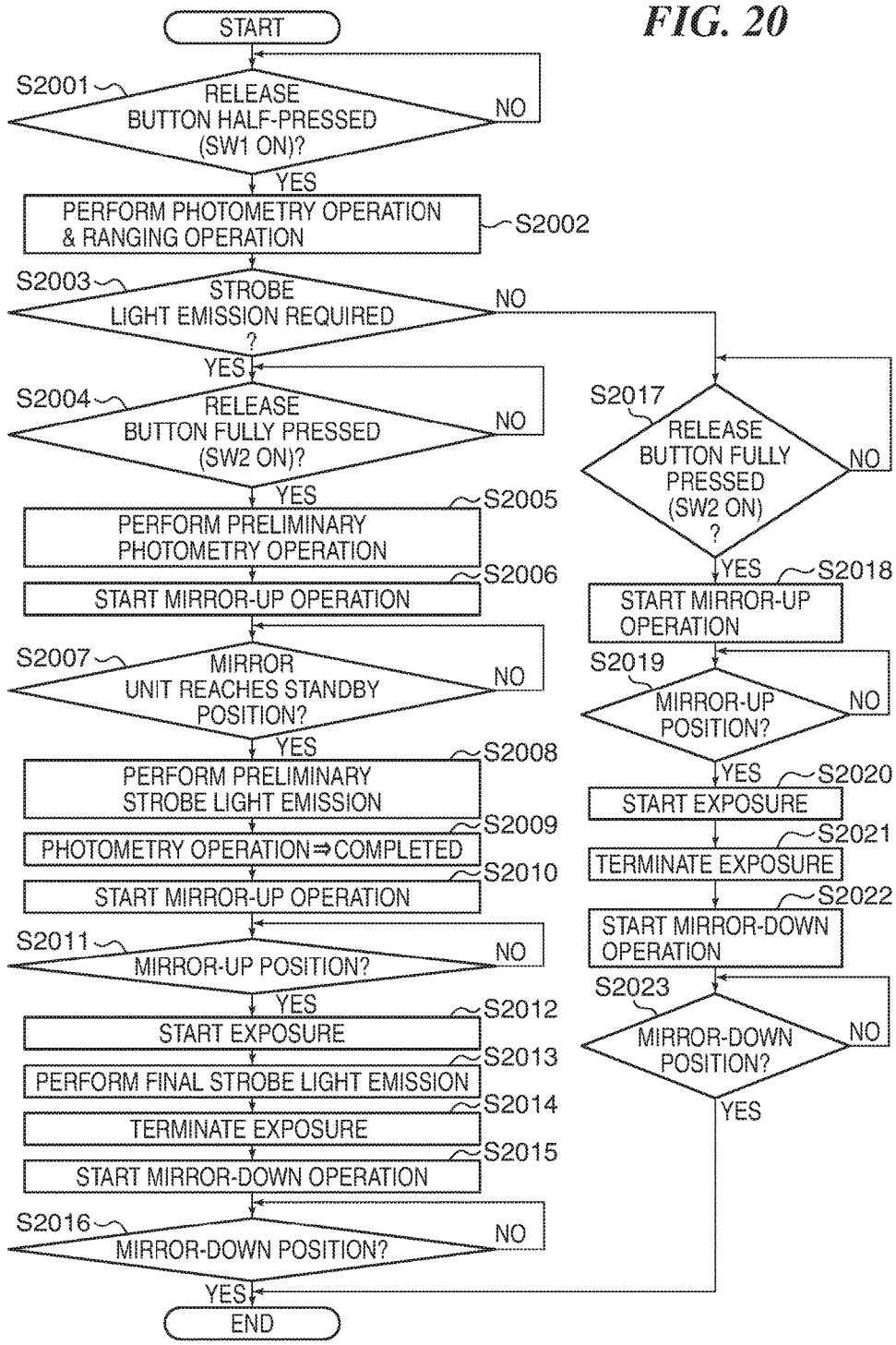
FIG. 20 is a flowchart of a first variation of the control process in FIG. 19 according to the second embodiment.

Next, a description will be given of a first variation of the control process performed by the camera as the image pickup apparatus according to the second embodiment. FIG. 20 is a flowchart of the first variation of the control process in FIG. 19. The first variation is the same as the control process according to the second embodiment except a step S2005 which is added, and a step S2009 which is different in processing from the corresponding step S1908 in FIG. 19 in accordance with the addition of the step S2005. That is, steps S2001 to S2004, S2006 to S2008, and S2010 to S2023 in FIG. 20 are the same as the steps S1901 to S1904, S1905 to S1907, and S1909 to S1922 in FIG. 19, respectively, and hence the following description is given only of the different points.

Referring to FIG. 20, in the step S2005, when the mirror unit 500 is in the mirror-down position, the MPU 100 causes the photometry sensor 23 to perform photometry, causes the photometric circuit 24 to record the photometric values of an object e.g. in the RAM, not shown, and proceeds to the step S2006.

In the step S2009, the MPU 100 compares the photometric values obtained in the step S2005 with photometric values obtained in the preliminary strobe light emission performed in a step S2008, and calculates a final strobe light emission amount based on a difference between these photometric values, thereby terminating the photometry operation, and proceeds to the step S2010.

In the present embodiment, the final strobe light emission amount is calculated based on a difference between the photometric values detected by the photometry sensor 23 when the mirror unit 500 is in the mirror-down position and the photometric values detected by the photometry sensor 23 in the preliminary light emission performed when the sub mirror 503 is in the standby position. This makes it possible to obtain a more accurate final strobe light emission amount by eliminating the influence of reflection of natural light without largely changing a time to elapse after the release switch (SW2) 7b is turned on until exposure is started (release time lag). The other configuration and advantageous effects are the same as described as to the second embodiment.

Next, a description will be given of a second variation of the control process performed by the camera according to the second embodiment with reference to FIGS. 21 and 22.

Figure 21:
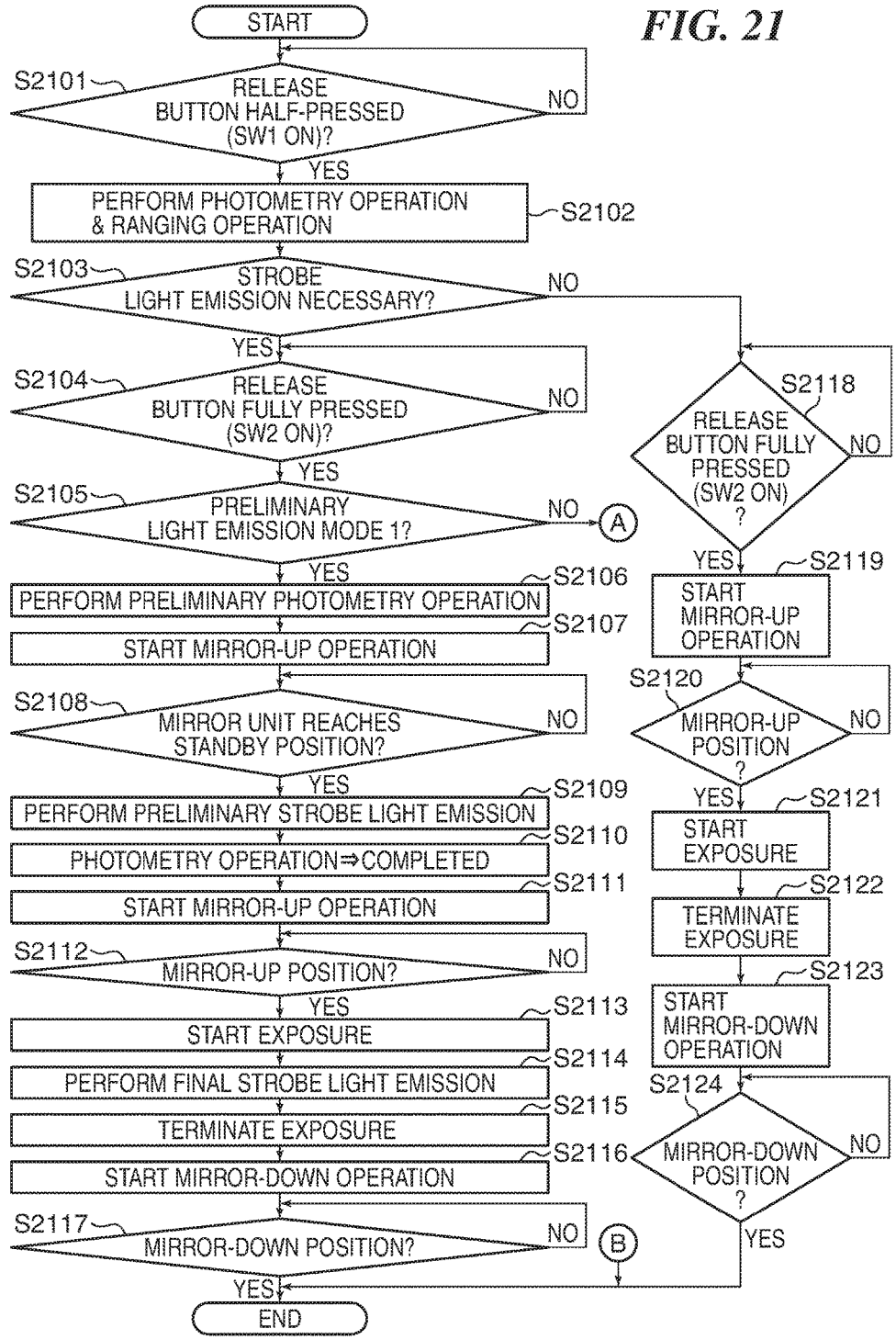
FIG. 21 is a flowchart of a second variation of the control process in FIG. 19 according to the second embodiment.

FIG. 21 is a flowchart of the second variation of the control process performed by the camera according to the second embodiment. The second variation of the control process in FIG. 21 is the same as the first variation except that a step S2105 in FIG. 21 is added, and processing in FIG. 22 is added in accordance with the addition of the step S2105. That is, steps S2101 to S2104, and S2106 to S2124 in FIG. 21 are the same as the steps S2001 to S2004, and S2005 to S2023 in FIG. 20, respectively, and hence the following description is given only of different points.

Referring to FIG. 21, in the step S2105, the MPU 100 determines whether or not, out of a preliminary light emission mode 1 and a preliminary light emission mode 2, the preliminary light emission mode 1 is selected by a user's operation or automatically selected. Then, if the preliminary light emission mode 1 is selected, the MPU 100 proceeds to the step S2106, whereas if the preliminary light emission mode 1 is not selected, the MPU 100 judges that the preliminary light emission mode 2 is selected, and proceeds to a step S2201 in FIG. 22.

Figure 22:
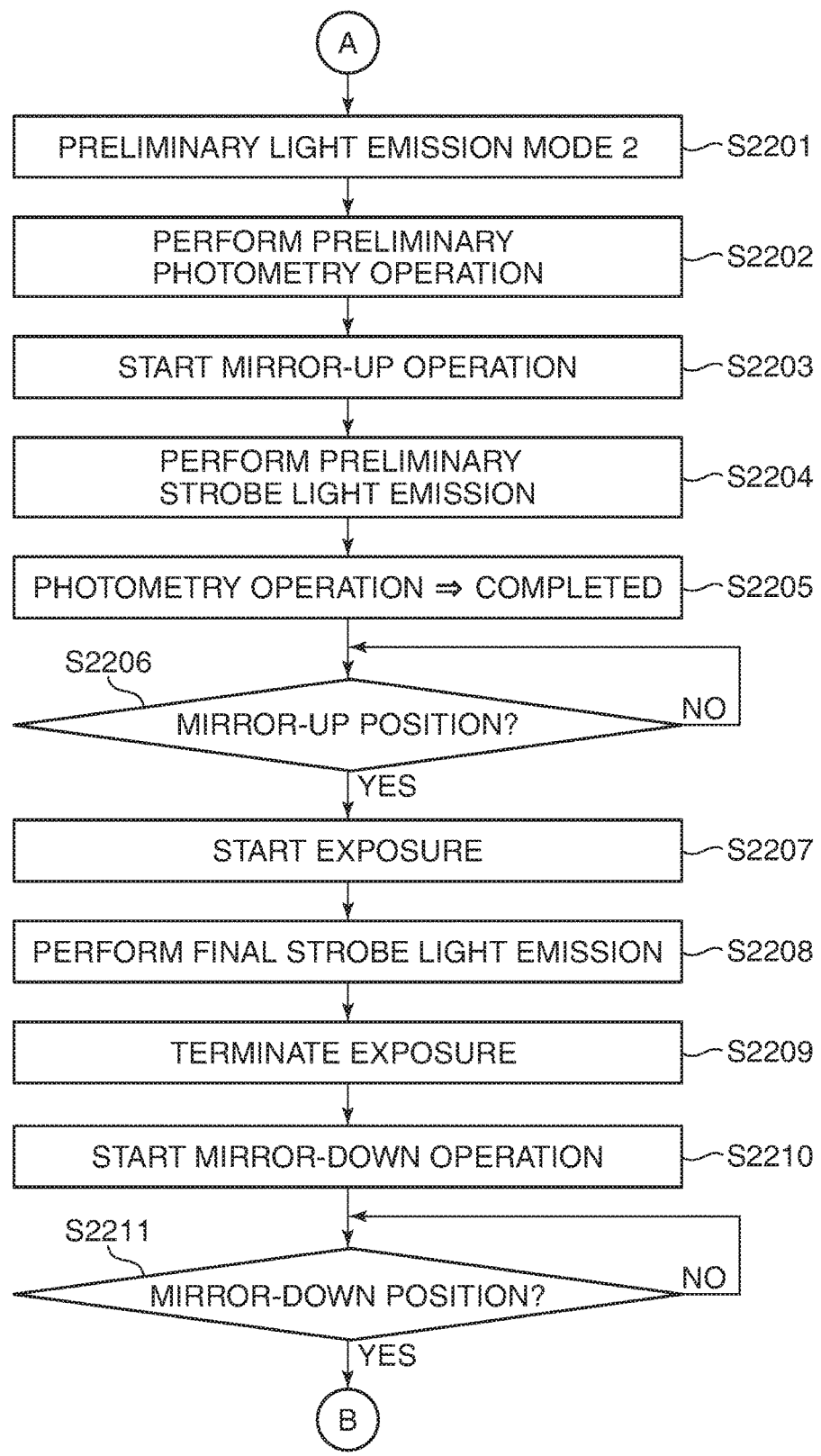
FIG. 22 is a continuation of FIG. 21.

FIG. 22 is a flowchart useful in explaining the operation of the camera, which is performed when the preliminary light emission mode 2 is selected. Note that steps S2202 to S2211 after the preliminary light emission mode 2 is selected in the step S2201 are the same as in the steps S2106, S2107, S2109, S2110, and S2112 to S2117, and hence description thereof is omitted.

Here, the preliminary light emission mode 1 is a mode in which the preliminary strobe light emission is performed in a state in which the sub mirror holder 504 of the mirror unit 500 is in the standby position (FIG. 3B). The preliminary light emission mode 2 is a mode in which the preliminary strobe light emission is performed in a state in which the mirror unit 500 is in the mirror-down position (FIG. 3A).

Selection of the preliminary light emission mode by a user's operation is performed e.g. by using a selection switch, not shown, provided on the camera. In the cause of automatic selection of the preliminary light emission mode by the camera, when it is determined based on a ranging operation in the step S2102 that an object is distant from the camera, the preliminary light emission mode 1 is selected, whereas when it is determined based on the same that an object is near, the preliminary light emission mode 2 is selected.

Assuming that the light amount of preliminary light emission performed by the strobe unit 601 is always constant, the light amount of a reflected light flux obtained in the preliminary light emission mode 1 is larger than the light amount of a reflected light flux obtained in the preliminary light emission mode 2.

Therefore, assuming that the preliminary strobe light emission is performed in the preliminary light emission mode 1, if the distance from the camera to an object is too small, the amount of reflected light obtained by the preliminary strobe light emission becomes too large, which may cause an erroneous operation of the photometry sensor 23. Therefore, to prevent this inconvenience, the preliminary light emission mode is selected as described above. In the present embodiment, by selecting the preliminary light emission mode according to the distance from the camera to an object, it is possible to obtain a more appropriate final strobe light emission amount. The other configuration and advantageous effects are the same as described as to the second embodiment and the first variation of the second embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-001096 filed Jan. 6, 2016, No. 2016-001097 filed Jan. 6, 2016, No. 2016-001098 filed Jan. 6, 2016, No. 2016-001099 filed Jan. 6, 2016, and No. 2016-021839 filed Feb. 8, 2016, which are hereby incorporated by reference herein in their entirety.

What is claimed is:

1. An image pickup apparatus comprising:
an image pickup device;
a first mirror holder that holds a first mirror and is configured to be movable between a first position in a photographing optical path and a second position retracted from the photographing optical path;
a second mirror holder that holds a second mirror in a state rotatably attached to said first mirror holder and is configured to be movable between a third position in the photographing optical path and a fourth position retracted from the photographing optical path;
a drive unit configured to move said second mirror holder between the third position and the fourth position;
a focus detection sensor configured to receive an object light flux that has passed through the first mirror and has been reflected from the second mirror, when said first mirror holder is in the first position and said second mirror holder is in the third position;
an instruction unit configured to instruct focus detection using said focus detection sensor in response to a first operation performed on an operation section and instruct image pickup using said image pickup device in response to a second operation performed on the operation section; and a control unit configured to cause said drive unit to rotate said second mirror holder in the third position toward said first mirror holder in the first position, after termination of the focus detection instructed in response to the first operation when said first mirror holder is in the first position and said second mirror holder is in the third position, and before the image pickup using said image pickup device is instructed in response to the second operation, to thereby cause said second mirror holder to move to a fifth position closer to said first mirror holder than the third position is.

2. The image pickup apparatus according to claim 1, wherein said control unit causes said drive unit to rotate said second mirror holder from the fifth position toward the fourth position, when the image pickup using said image pickup device is instructed in response to the second operation in a state in which said second mirror holder is in the fifth position, to thereby move said first mirror holder from the first position to the second position.

3. The image pickup apparatus according to claim 1, wherein said control unit causes said drive unit to rotate said second mirror holder from the fourth position to the fifth position, after termination of the image pickup using said image pickup device instructed according to the second operation, to thereby move said first mirror holder from the second position to the first position.

4. The image pickup apparatus according to claim 1, wherein said control unit causes said drive unit to rotate said second mirror holder from the fifth position toward the third position when the first operation is terminated in a state in which said second mirror holder is in the fifth position.

5. The image pickup apparatus according to claim 1, further comprising:
a photometry sensor configured to receive an object light flux reflected from the first mirror, when said first mirror holder is in the first position; and
an object detection unit configured to perform object detection based on an output from said photometry sensor, and
wherein said control unit causes said drive unit to rotate said second mirror holder from the fifth position toward the third position, when it is determined by said object detection unit that the object has moved in a state in which said second mirror holder is in the fifth position.

6. The image pickup apparatus according to claim 1, further comprising:
a determination unit configured to determine whether or not to perform the focus detection using said focus detection unit, and
wherein in a case where it is determined by said determination unit that the focus detection is not to be performed, said control unit causes said drive unit to rotate said second mirror holder in the third position toward said first mirror holder in the first position, to thereby move said second mirror holder to the fifth position with respect to said first mirror holder.

7. The image pickup apparatus according to claim 1, further comprising:
a photometry unit configured to perform photometry on an object light flux when said first mirror holder is in the first position; and a correction unit configured to correct an output value from said photometry unit according to a position of said second mirror holder when the photometry is performed.

8. An image pickup apparatus comprising:
an image pickup device;
a first mirror holder that holds a first mirror;
a second mirror holder that holds a second mirror and is configured to be capable of changing a relative position with respect to said first mirror holder;
a focus detection sensor configured to receive an object light flux that has passed through the first mirror and has been reflected from the second mirror, when a position of said first mirror holder and a position of said second mirror holder are in a first state; and
a drive unit configured to make the position of said second mirror holder closer to said first mirror holder than in the first state, after performing the focus detection using said focus detection sensor when the position of said first mirror holder and the position of said second mirror holder are in the first state, and before image pickup using said image pickup device is instructed.

9. A method of controlling an image pickup apparatus including:
an image pickup device,
a first mirror holder that holds a first mirror and is configured to be movable between a first position in a photographing optical path and a second position retracted from the photographing optical path,
a second mirror holder that holds a second mirror in a state rotatably attached to the first mirror holder and is configured to be movable between a third position in the photographing optical path and a fourth position retracted from the photographing optical path,
a drive unit configured to move the second mirror holder between the third position and the fourth position, and
a focus detection sensor configured to receive an object light flux that has passed through the first mirror and has been reflected from the second mirror, when the first mirror holder is in the first position and the second mirror holder is in the third position,
the method comprising:
instructing focus detection using the focus detection sensor in response to a first operation performed on an operation section;
instructing image pickup using the image pickup device in response to a second operation performed on the operation section; and
causing the drive unit to rotate the second mirror holder in the third position toward the first mirror holder in the first position, after termination of the focus detection instructed in response to the first operation when the first mirror holder is in the first position and the second mirror holder is in the third position, and before the image pickup using the image pickup device is instructed in response to the second operation, to thereby cause the second mirror holder to move to a fifth position closer to the first mirror holder than the third position is.

10. A method of controlling an image pickup apparatus including:
an image pickup device,
a first mirror holder that holds a first mirror,
a second mirror holder that holds a second mirror and is configured to be capable of changing a relative position with respect to the first mirror holder, and a focus detection sensor configured to receive an object light flux that has passed through the first mirror and has been reflected from the second mirror, when a position of the first mirror holder and a position of the second mirror holder are in a first state, the method comprising:

making the position of the second mirror holder closer to the first mirror holder than in the first state, after performing the focus detection using the focus detection sensor when the position of the first mirror holder and the position of the second mirror holder are in the first state, and before the image pickup using the image pickup device is instructed.

* * * * *